(12) United States Patent
Kitamura

(10) Patent No.: US 11,138,016 B2
(45) Date of Patent: Oct. 5, 2021

(54) SYSTEM CONSTRUCTION SUPPORT DEVICE, SYSTEM CONSTRUCTION SUPPORT METHOD, AND NON-TRANSITORY STORAGE MEDIUM

(71) Applicant: Mitsubishi Electric Corporation, Tokyo (JP)

(72) Inventor: Yuta Kitamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/962,231

(22) PCT Filed: Mar. 14, 2018

(86) PCT No.: PCT/JP2018/010077
§ 371 (c)(1),
(2) Date: Jul. 15, 2020

(87) PCT Pub. No.: WO2019/176034
PCT Pub. Date: Sep. 19, 2019

(65) Prior Publication Data
US 2021/0064382 A1 Mar. 4, 2021

(51) Int. Cl.
*G06F 9/00* (2006.01)
*G06F 9/4401* (2018.01)
*G06F 21/60* (2013.01)

(52) U.S. Cl.
CPC .......... *G06F 9/4401* (2013.01); *G06F 21/602* (2013.01); *G06F 9/4411* (2013.01)

(58) Field of Classification Search
CPC .............................. G06F 9/4401; G06F 21/601
(Continued)

(56) References Cited

U.S. PATENT DOCUMENTS 5,608,342 A * 3/1997 Trimberger ............. G06F 30/34
326/38
5,740,469 A * 4/1998 Yin .......................... G06F 8/52
345/520
(Continued)

FOREIGN PATENT DOCUMENTS

CN 103688262 A 3/2014
DE 10 2006 059 829 A1 6/2008
(Continued)

OTHER PUBLICATIONS

Office Action dated Dec. 16, 2020 in German Patent Application No. 11 2018 006 439.5, 16 pages.
(Continued)

*Primary Examiner* — Volvick Derose
(74) *Attorney, Agent, or Firm* — Xsensus LLP

(57) ABSTRACT

A system construction support device includes a storage unit, an operation receiving unit, a setting unit, and an arrangement control unit. The storage unit stores a system configuration file having a base area including a plurality of objects hierarchized, the plurality of objects each being design information on an instrument of a factory automation system. The setting unit sets identification information for at least one of the plurality of objects on the basis of the user operation received by the operation receiving unit. The arrangement control unit moves the object for which the identification information has been set by the setting unit, to a different location within the system configuration file or to an external file, and places a dummy object at an original location of the object moved to the different location, the dummy object including the identification information set for the object moved and information on a destination of the object moved.

14 Claims, 13 Drawing Sheets

(58) Field of Classification Search
USPC .......................................................... 713/1
See application file for complete search history.

(56) References Cited

U.S. PATENT DOCUMENTS

| | | | | |
|---|---|---|---|---|
| 5,835,701 | A * | 11/1998 | Hastings | G06F 8/447 |
| | | | | 714/35 |
| 8,190,850 | B1 * | 5/2012 | Davenport | G06F 16/10 |
| | | | | 711/202 |
| 9,372,476 | B2 | 6/2016 | Nakata et al. | |
| 2004/0027931 | A1 * | 2/2004 | Morita | G11B 20/10527 |
| | | | | 369/30.09 |
| 2004/0064487 | A1 * | 4/2004 | Nguyen | G06F 16/214 |
| 2006/0074931 | A1 * | 4/2006 | Burka | G06F 8/54 |
| 2006/0184273 | A1 * | 8/2006 | Sawada | G06N 3/008 |
| | | | | 700/245 |
| 2006/0242285 | A1 * | 10/2006 | Moriwaki | H04L 67/12 |
| | | | | 709/223 |
| 2006/0265378 | A1 * | 11/2006 | Koseki | G06F 16/10 |
| 2007/0009228 | A1 * | 1/2007 | Matsuno | H04N 5/772 |
| | | | | 386/287 |
| 2007/0016622 | A1 * | 1/2007 | Havewala | G06F 16/1737 |
| 2007/0016631 | A1 * | 1/2007 | Robert | G06F 16/1737 |
| 2007/0052711 | A1 * | 3/2007 | Gordon | G06F 3/011 |
| | | | | 345/473 |
| 2007/0266045 | A1 * | 11/2007 | Bansal | H04L 67/14 |
| 2008/0049349 | A1 * | 2/2008 | Nakase | H04N 1/00204 |
| | | | | 360/48 |
| 2008/0069540 | A1 * | 3/2008 | Takagi | H04N 5/772 |
| | | | | 386/224 |
| 2008/0250037 | A1 * | 10/2008 | Date | G11B 27/28 |
| 2009/0172814 | A1 * | 7/2009 | Khosravi | G06F 21/51 |
| | | | | 726/23 |
| 2010/0333092 | A1 * | 12/2010 | Stefansson | H04L 67/10 |
| | | | | 718/100 |
| 2011/0276964 | A1 * | 11/2011 | Ogawa | G06F 9/4856 |
| | | | | 718/1 |
| 2012/0036168 | A1 * | 2/2012 | Hamada | G11B 27/034 |
| | | | | 707/803 |
| 2013/0254611 | A1 * | 9/2013 | Amerga | G06F 11/1402 |
| | | | | 714/746 |
| 2013/0339420 | A1 * | 12/2013 | Srinivasan | H04L 29/06 |
| | | | | 709/203 |
| 2014/0025770 | A1 * | 1/2014 | Warfield | G06F 16/134 |
| | | | | 709/213 |
| 2014/0081431 | A1 * | 3/2014 | Nakata | G05B 15/02 |
| | | | | 700/83 |
| 2014/0244644 | A1 * | 8/2014 | Mashinchi | G16H 40/67 |
| | | | | 707/737 |
| 2015/0270969 | A1 * | 9/2015 | Ishizaka | H04L 41/0253 |
| | | | | 713/185 |
| 2015/0331689 | A1 * | 11/2015 | Blahaerath | G06F 8/30 |
| | | | | 717/106 |
| 2016/0159462 | A1 * | 6/2016 | Hayes | B64C 19/00 |
| | | | | 701/3 |
| 2017/0061138 | A1 * | 3/2017 | Lambert | H04L 63/0428 |
| 2018/0157655 | A1 * | 6/2018 | Dain | G06F 16/119 |
| 2018/0181583 | A1 * | 6/2018 | Godman | G06F 17/18 |
| 2018/0182057 | A1 * | 6/2018 | Corcoran | G06T 1/0021 |
| 2019/0107969 | A1 * | 4/2019 | Vandewater | G06F 3/0616 |
| 2019/0190999 | A1 * | 6/2019 | Cheung | H04L 67/26 |
| 2020/0276994 | A1 * | 9/2020 | Nakanishi | B61L 15/0018 |

FOREIGN PATENT DOCUMENTS

| | | |
|---|---|---|
| JP | 2001-306558 A | 11/2001 |
| JP | 2003-199179 A | 7/2003 |
| JP | 2011-028352 A | 2/2011 |
| JP | 2013-137826 A | 7/2013 |

OTHER PUBLICATIONS

International Search Report and Written Opinion dated May 15, 2018 for PCT/JP2018/010077 filed on Mar. 14, 2018, 7 pages including English Translation of the International Search Report.

Notification of Reasons for Refusal received for Japanese Patent Application No. 2018-541446, dated Nov. 6, 2018, 6 pages including English Translation.

Decision to Grant a Patent received for Japanese Patent Application No. 2018-541446, dated Mar. 12, 2019, 5 pages including English Translation.

Office Action dated Mar. 30, 2021, in corresponding Chinese patent Application No. 201880091002.2, 12 pages.

* cited by examiner

SYSTEM CONSTRUCTION SUPPORT DEVICE, SYSTEM CONSTRUCTION SUPPORT METHOD, AND NON-TRANSITORY STORAGE MEDIUM

CROSS-REFERENCE TO RELATED APPLICATION

The present application is based on PCT filing PCT/JP2018/010077, filed Mar. 14, 2018, the entire contents of which are incorporated herein by reference.

FIELD

The present invention relates to a system construction support device, a system construction support method, and a system construction support program used for developing a factory automation (FA) system.

BACKGROUND

An FA system is configured by a plurality of instruments connected to one another. In designing an FA system, a system configuration file including a plurality of objects, i.e. design information on instruments of the FA system, is created. In constructing an FA system, in some case, the end user of the FA system orders a plurality of external companies to develop part of the FA system for parallel development.

Conventionally, the end user of an FA system creates a system configuration file on a supplier-by-supplier basis, and places an order, using the system configuration file for each supplier. Therefore, as the number of suppliers increases, the number of man-hours for managing system configuration files increases.

A method for managing documents in a supply chain is disclosed in Patent Literature 1. The technique disclosed in Patent Literature 1 determines whether to allow a user to read or write document segments on the basis of an access right associated with a user who has accessed electronic document data including a plurality of document segments.

CITATION LIST

Patent Literature

Patent Literature 1: Japanese Patent Application Laid-open No. 2001-306558

SUMMARY

Technical Problem

For the technique described in Patent Literature 1, document segments of a plurality of different users can be included in one piece of electronic document data. In such a case, a security sheet in which a user ID is associated with an access right set for each document segment is stored in the database separately from the electronic document data. When this technique is applied to the design of an FA system, a file including a plurality of objects and a security sheet in which a supplier is associated with an access right set for each object are separately stored in the database.

Unfortunately, the system configuration file and the security sheet may fail to be associated with each other due to, for example, the deletion of the security sheet from the database or the movement of the system configuration file or the security sheet to a different location in the database. The failure to establish the association between the system configuration file and the security sheet makes it impossible to grasp the relationship between suppliers and objects in the system configuration file.

The present invention has been made in view of the above, and an object thereof is to obtain a system construction support device capable of generating a system configuration file in which the relationship between suppliers and objects can be grasped without using a security sheet.

Solution to Problem

In order to solve the above-described problem and achieve the object, a system construction support device of the present invention comprises a storage unit, an operation receiving unit, a setting unit, and an arrangement control unit. The storage unit stores a system configuration file having a base area including a plurality of objects hierarchized, the plurality of objects each being design information on an instrument of a factory automation system. The operation receiving unit receives a user operation. The setting unit sets identification information for at least one of the plurality of objects on a basis of the user operation received by the operation receiving unit. The arrangement control unit moves the object for which the identification information has been set by the setting unit, to a different location within the system configuration file or to an external file, and places a dummy object at an original location of the object moved to the different location, the dummy object including the identification information set for the object moved and information on a destination of the object moved.

Advantageous Effects of Invention

The system construction support device, the system construction support method, and the system construction support program according to the present invention can achieve the effect of generating the system configuration file in which the relationship between the suppliers and the objects can be grasped.

DESCRIPTION OF EMBODIMENT

Hereinafter, a system construction support device, a system construction support method, and a system construction support program according to an embodiment of the present invention will be described in detail with reference to the drawings. The present invention is not limited to the embodiment.

First Embodiment

Figure 1:
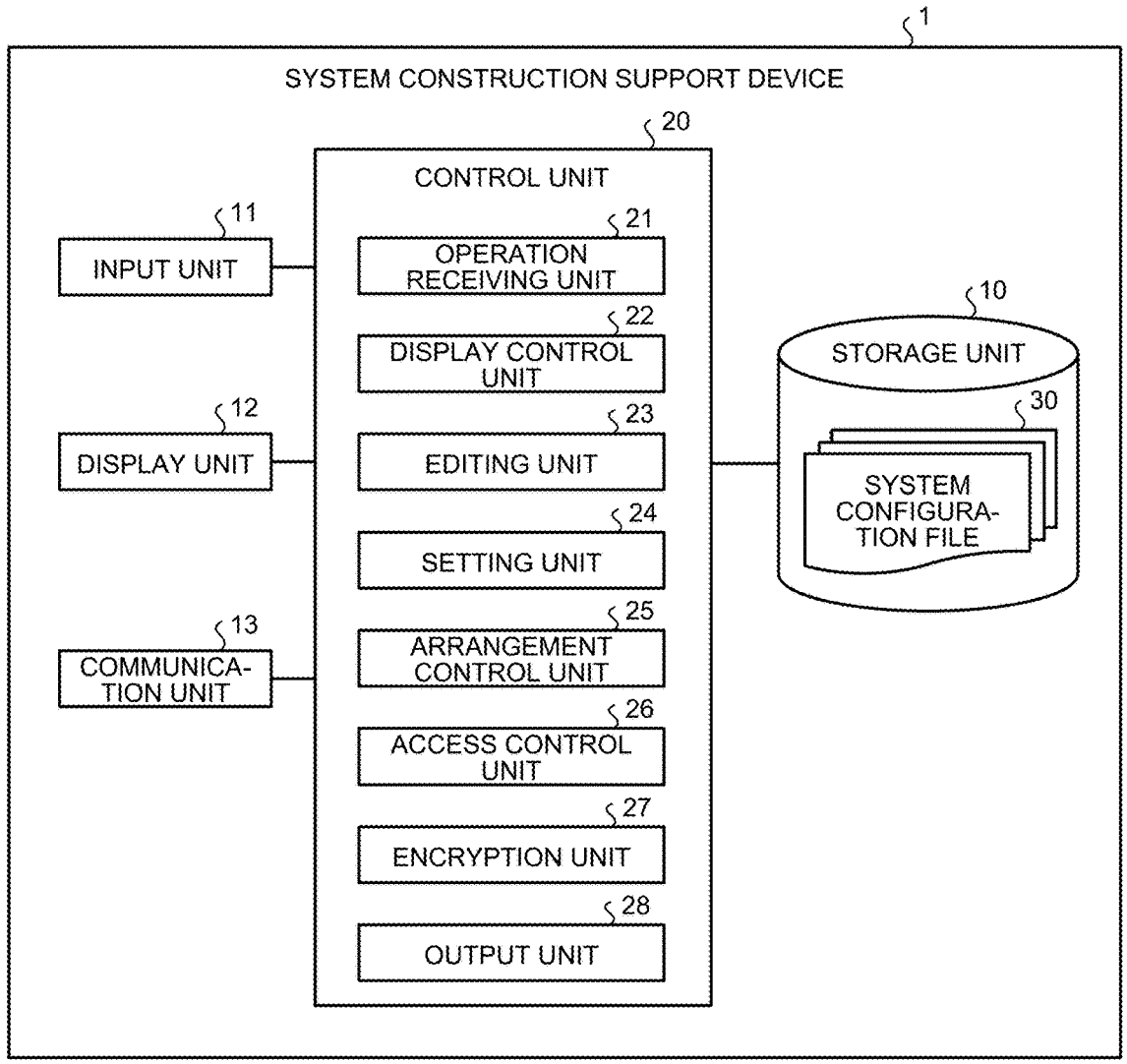
FIG. 1 is a block diagram illustrating an exemplary configuration of a system construction support device according to a first embodiment of the present invention.

FIG. 1 is a block diagram illustrating an exemplary configuration of a system construction support device according to the first embodiment of the present invention. The system construction support device 1 illustrated in FIG. 1 assists a user in constructing a factory automation (FA) system. The FA system is a system for automating the production process. The FA system includes a plurality of instruments connected to one another. As illustrated in FIG. 1, the system construction support device 1 includes a storage unit 10, an input unit 11, a display unit 12, a communication unit 13, and a control unit 20.

The storage unit 10 stores one or more system configuration files 30. The system configuration file 30 has a base area including a plurality of objects hierarchized. An object is design information on an instrument of the FA system. Design information includes information indicating content of design specifications of an instrument of the FA system. The user orders one or more external companies to develop at least part of the FA system. Hereinafter, an external company that receives the order for the development is referred to as a supplier. The above-described user is not limited to the end user of the FA system, and may be an employee of a company fully entrusted by the end user with the construction of the FA system, for example. The user who browses the system configuration file 30 may be an employee of a supplier or the like.

Figure 2:
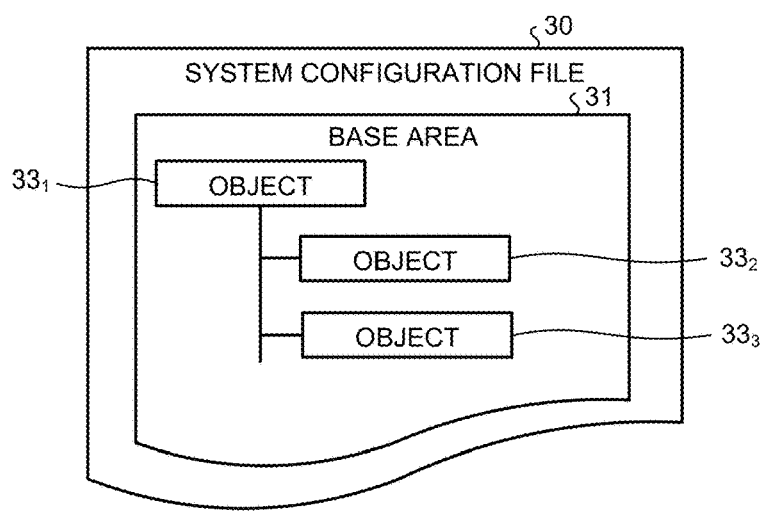
FIG. 2 is a diagram illustrating an example of a system configuration file according to the first embodiment.

FIG. 2 is a diagram illustrating an example of a system configuration file according to the first embodiment. A base area 31 of the system configuration file 30 illustrated in FIG. 2 includes hierarchically structured objects $33_1$, $33_2$, and $33_3$. The object $33_1$ is placed in the highest layer of the hierarchical structure, and the objects $33_2$ and $33_3$ are placed in the layer immediately below the object $33_1$. Hereinafter, the plurality of objects $33_1$, $33_2$, and $33_3$ may be collectively referred to as the object(s) 33.

The input unit 11 includes, for example, a keyboard and a mouse. Note that the input unit 11 may include a touch panel formed on the display unit 12. The display unit 12 is, for example, a liquid crystal display (LCD), an organic electro-luminescence (EL) display, or the like. The display screen of the display unit 12 is controlled by the control unit 20. The communication unit 13 is connected to a communication network by wire or wirelessly, and can exchange information with another device via the communication network.

The control unit 20 displays the plurality of hierarchically structured objects 33 on the display unit 12 on the basis of the system configuration file 30 stored in the storage unit 10. The control unit 20 also sets identification information for at least some of the plurality of objects 33 on the basis of an operation on the input unit 11. Identification information is information for identifying a supplier.

Further, the control unit 20 executes change processing for changing a part of the system configuration file 30 on the basis of the setting of identification information for the object 33. Specifically, the control unit 20 moves the object 33 for which identification information has been set, to a different location in the system configuration file 30, and places a dummy object at an original location from which the object 33 moved to the different location. The dummy object includes the identification information set for the moved object 33, and information on a destination to which the object 33 moved. The dummy object is an object different from the object 33 and does not include design information on the FA system.

Figure 3:
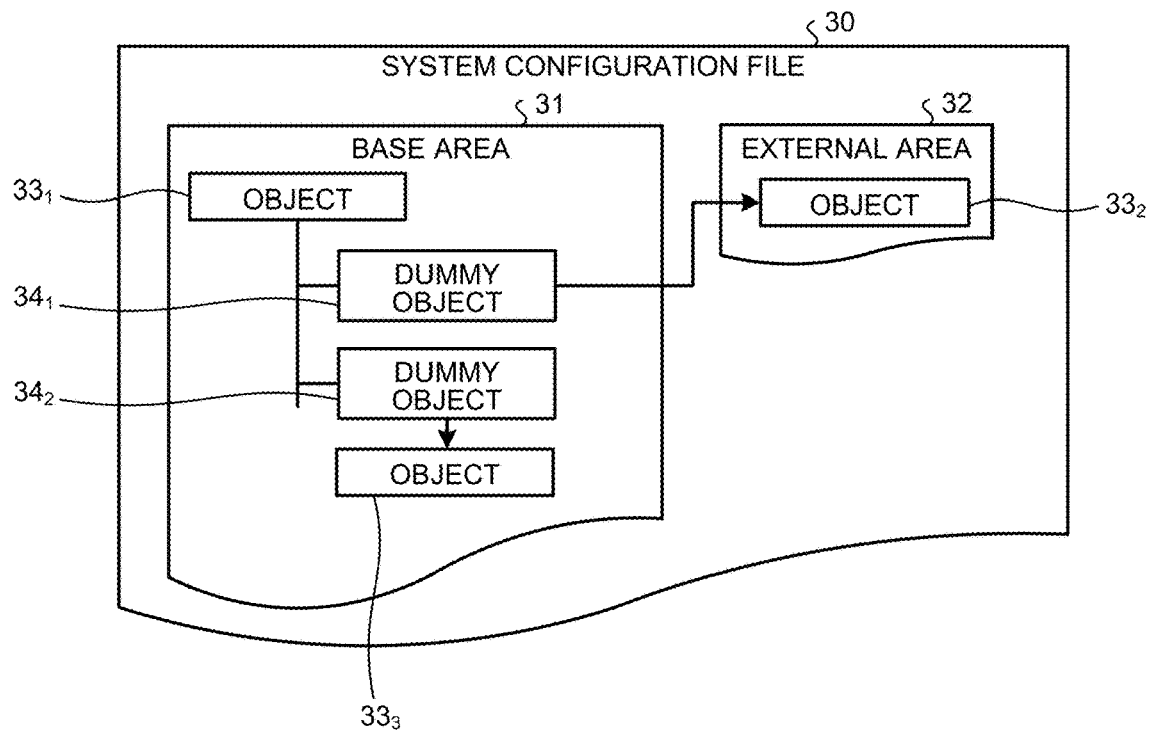
FIG. 3 is a diagram illustrating the system configuration file illustrated in FIG. 2 partially changed by a control unit according to the first embodiment.

A description will be made as to change processing on the system configuration file 30 where identification information has been set for the objects $33_2$ and $33_3$ illustrated in FIG. 2. FIG. 3 is a diagram illustrating the system configuration file illustrated in FIG. 2 partially changed by the control unit according to the first embodiment.

In the example illustrated in FIG. 3, the object $33_2$ for which identification information has been set is moved to an external area 32 outside the base area 31 within the system configuration file 30. The object $33_3$ for which identification information has been set is moved to the layer immediately below the original location of the object $33_3$ in the hierarchical structure of the base area 31.

In addition, a dummy object $34_1$ including the identification information set for the object $33_2$ and information on the destination of the object $33_2$ is placed at the original location of the object $33_2$. Placed at the original location of the object $33_3$ is a dummy object $34_2$ including the identification information set for the moved object $33_3$ and information on the destination of the object $33_3$. Information on the destination of the object 33 is information indicating the location of the moved object 33 in the system configuration file 30. Hereinafter, the dummy objects $34_1$ and $34_2$ may be collectively referred to as the dummy object(s) 34.

After changing a part of the system configuration file 30 in that manner, the control unit 20 stores the changed system configuration file 30 in the storage unit 10. Because the changed system configuration file 30 having suppliers and objects 33 associated with each other is a single file, design information on the FA system can be easily managed. In addition, the dummy object 34 is placed in the changed system configuration file 30. Because the dummy object 34 includes the identification information set for the moved object 33 and information on the destination of the object 33, the dummy object 34 can be used to display, on the display unit 12, design information related to the selected supplier in the system configuration file 30.

For example, when identification information is input or selected by an operation on the input unit 11, the control unit 20 permits access to the object 33 at the destination on the basis of on the destination information included in the dummy object 34 including the identification information that matches the input or selected identification information. The control unit 20 reads, from the storage unit 10, the object 33 to which access has been permitted, and displays the read object 33 on the display unit 12. Consequently, the object 33 related to the supplier identified by the input of identification information to the input unit 11 or the selection of identification information via the input unit 11 can be displayed on the display unit 12.

In the example described above, the control unit 20 moves the object $33_2$ for which identification information has been set, to the external area 32 within the system configuration file 30. However, the control unit 20 can transfer the object $33_2$ for which identification information has been set, to an external file different from the system configuration file 30. Also in this case, the changed system configuration file 30 has suppliers and objects 33 associated with each other. Using that single system configuration file 30 makes it possible to grasp the relationship between suppliers and objects.

Hereinafter, the configuration and operation of the control unit 20 of the system construction support device 1 will be described in more detail. As illustrated in FIG. 1, the control unit 20 includes an operation receiving unit 21, a display control unit 22, an editing unit 23, a setting unit 24, an arrangement control unit 25, an access control unit 26, an encryption unit 27, and an output unit 28.

The operation receiving unit 21 receives a user operation performed via the input unit 11. The operation receiving unit 21 can also receive a user operation provided by an external device via the communication unit 13. The display control unit 22 controls a display screen displayed on the display unit 12 or the display unit of an external device.

The editing unit 23 performs editing processing on information indicating the system configuration of the FA system on the basis of a user operation received by the operation receiving unit 21. The editing unit 23 also generates the system configuration file 30 on the basis of information indicating the system configuration subjected to editing processing, and stores the generated system configuration file 30 in the storage unit 10.

The setting unit 24 sets identification information for each of the plurality of objects 33 on the basis of a user operation received by the operation receiving unit 21. For example, when an operation for setting identification information on a supplier for the object 33 is received by the operation receiving unit 21, the setting unit 24 can set the set identification information on the supplier for the object 33.

The arrangement control unit 25 moves the object 33 for which identification information has been set by the setting unit 24, to a different location within the system configuration file 30 or to an external file. A different location within the system configuration file 30 is, for example, a different location in the hierarchical structure inside the base area 31, or a location outside the base area 31 and within the system configuration file 30. The above-described external file is newly created by the arrangement control unit 25 every time the object 33 is moved or on a supplier-by-supplier basis. Further, the arrangement control unit 25 places, at the original location of the object 33 that moved to a different location, the dummy object 34 including the identification information set for the moved object 33 and information on the destination of the moved object 33.

When identification information is input or selected through the operation receiving unit 21, the access control unit 26 permits access to the object 33 at the destination on the basis of the destination information included in the dummy object 34 including the identification information that matches the identification information input or selected through the operation receiving unit 21.

The encryption unit 27 can encrypt the external area 32 of the system configuration file 30, using different encryption keys for different suppliers. In a case where the external area 32 is provided for each supplier, the encryption unit 27 can use different encryption keys for different suppliers to encrypt the corresponding external area 32. Consequently, for example, even in a case where it is difficult to encrypt each object 33 in the base area 31, the external area 32 to which the object 33 has been moved from the base area 31 is encrypted, thereby facilitating encryption on a supplier-by-supplier basis. In addition, in a case where an external file is generated by the arrangement control unit 25, the encryption unit 27 can encrypt the external file generated by the arrangement control unit 25, using different encryption keys for different suppliers. Consequently, for example, even in a case where it is difficult to encrypt each object 33 in the base area 31, encryption for each supplier can be easily performed as the external file to which the object 33 has been moved from the base area 31 is encrypted. Performing the encryption on a file-by-file basis further facilitates the encryption for each supplier. Note that the encryption unit 27 can also encrypt the base area 31, using a single key common to the suppliers.

The output unit 28 can output the system configuration file 30 stored in the storage unit 10, from the communication unit 13 to an external device via the communication network (not illustrated). The output unit 28 can also write the system configuration file 30 to a recording medium (not illustrated).

Figure 4:
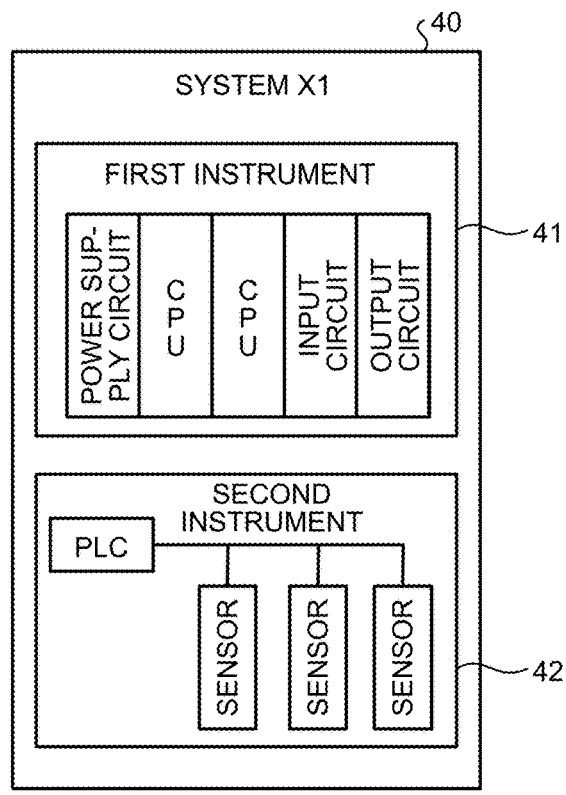
FIG. 4 is a diagram illustrating an example of an FA system according to the first embodiment.

Here, processing in the system construction support device 1 will be described with reference to generation processing, change processing, and displaying processing on a system configuration file of the FA system illustrated in FIG. 4. FIG. 4 is a diagram illustrating an example of an FA system according to the first embodiment. The FA system 40 illustrated in FIG. 4 includes a first instrument 41 and a second instrument 42. The first instrument 41 includes components that are a power supply circuit, central processing units (CPUs), an input circuit, and an output circuit. The second instrument 42 includes components that are a programmable logic controller (PLC) and sensors. The components of the first instrument 41 and the components of the second instrument 42 can also be referred to as instruments. Note that the FA system 40 may be referred to as "system X1".

Figure 5:
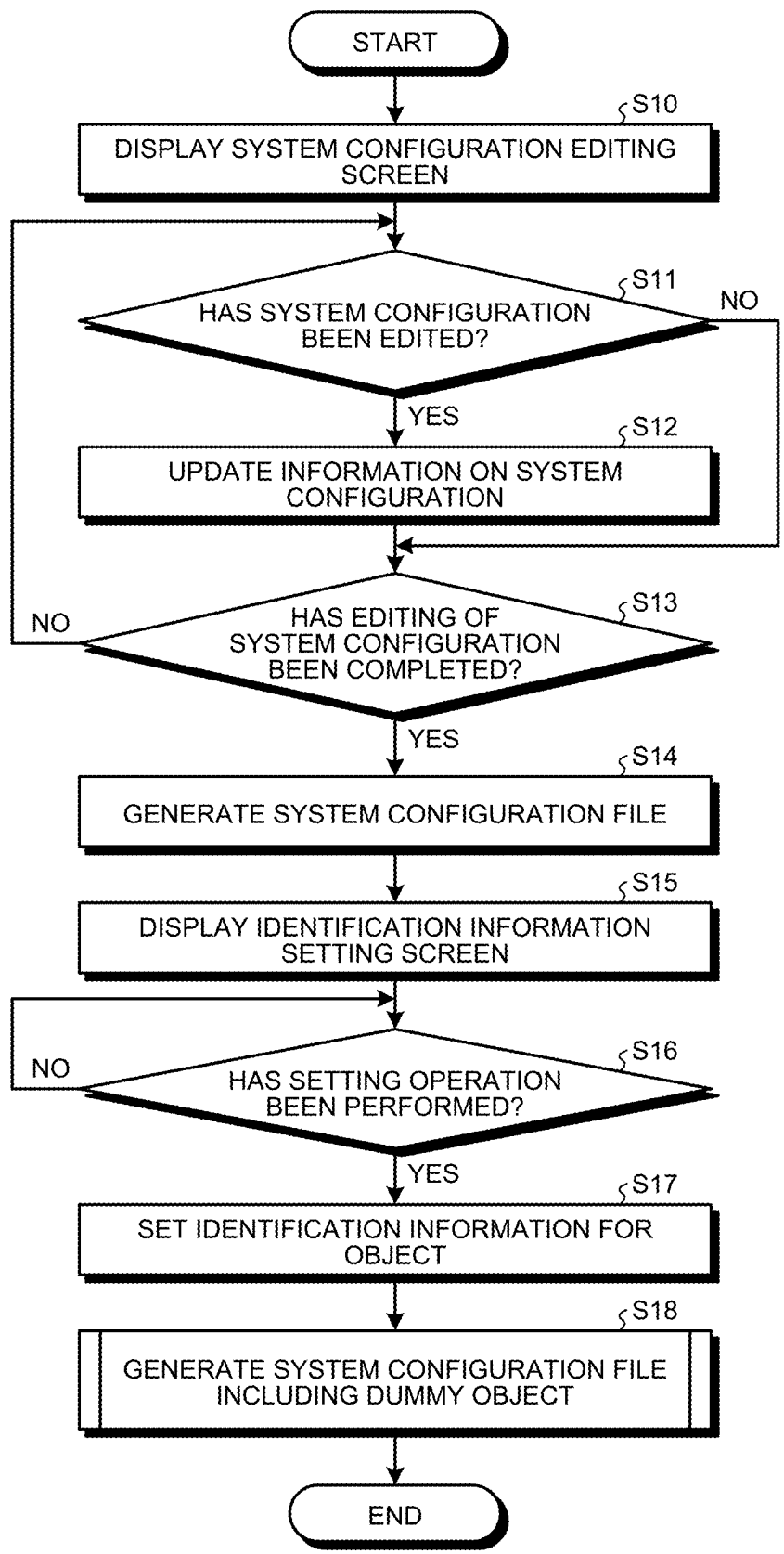
FIG. 5 is a flowchart illustrating an example of generation processing and change processing on a system configuration file according to the first embodiment.

First, generation processing on the system configuration file 30 by the control unit 20 of the system construction support device 1 will be described. FIG. 5 is a flowchart illustrating an example of generation processing and change processing on a system configuration file according to the first embodiment.

As illustrated in FIG. 5, the display control unit 22 of the control unit 20 displays a system configuration editing screen on the display unit 12 (step S10). The editing unit 23 of the control unit 20 determines whether the system configuration has been edited (step S11). When the operation receiving unit 21 receives an operation of inputting or changing the configuration of the FA system 40, the editing unit 23 determines that the system configuration has been edited.

When determining that the system configuration has been edited (step S11: Yes), the editing unit 23 updates information on the system configuration (step S12). When determining that the system configuration has not been edited (step S11: No), or after step S12, the editing unit 23 determines whether the editing of the system configuration has been completed (step S13).

Figure 6:
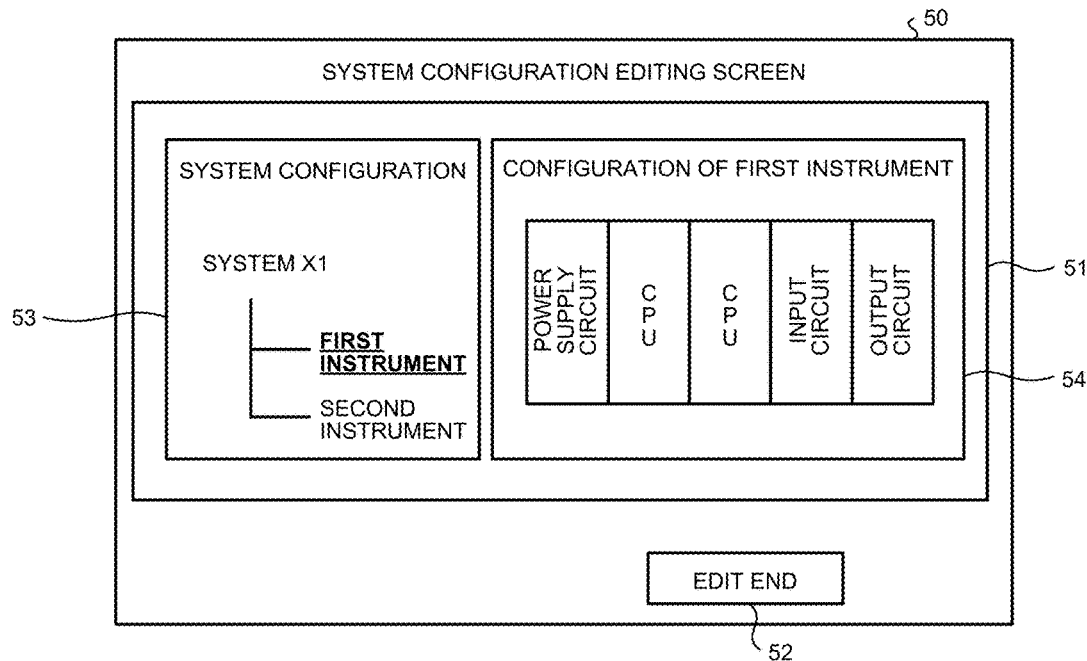
FIG. 6 is a diagram illustrating an example of a system configuration editing screen according to the first embodiment.

FIG. 6 is a diagram illustrating an example of a system configuration editing screen according to the first embodiment. The system configuration editing screen 50 illustrated in FIG. 6 includes an edit area 51 and an edit end button 52. The edit area 51 displays the configuration of the FA system 40 that is to be edited. The edit area 51 includes a first area 53 and a second area 54. The first area 53 displays the first instrument 41 and the second instrument 42 that constitute the FA system 40. The second area 54 displays the configuration of the devices included in the FA system 40. In the first area 53, in addition to the first instrument 41 and the second instrument 42, the components of each of the first instrument 41 and the second instrument 42 can be displayed.

In step S13 illustrated in FIG. 5, the editing unit 23 determines that the editing of the system configuration has been completed when an operation on the edit end button 52 is received by the operation receiving unit 21. When determining that the editing of the system configuration has not been completed (step S13: No), the editing unit 23 shifts the processing to step S11. When determining that the editing of the system configuration has been completed (step S13: Yes), the editing unit 23 generates the system configuration file 30 on the basis of information on the system configuration updated by the editing unit 23 (step S14).

Figure 7:
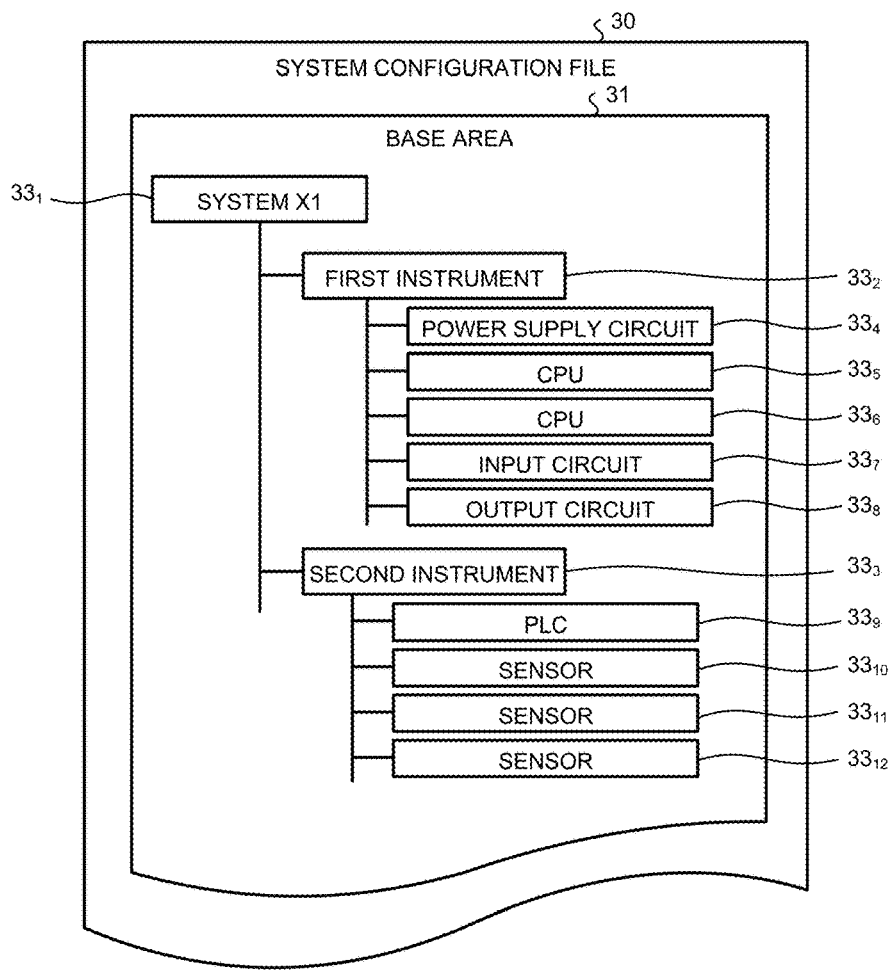
FIG. 7 is a diagram illustrating an example of a system configuration file of the FA system illustrated in FIG. 4.

FIG. 7 is a diagram illustrating an example of a system configuration file of the FA system illustrated in FIG. 4. As illustrated in FIG. 7, the system configuration file 30 of the FA system 40 illustrated in FIG. 4 is a file in which a plurality of objects $33_1$ to $33_{12}$, i.e. design information on the FA system 40, is hierarchically described. Hereinafter, the plurality of objects $33_1$ to $33_{12}$ may be collectively referred to as the object(s) 33.

The object $33_1$ is design information on the FA system 40. The object $33_2$ is design information on the first instrument 41. The object $33_3$ is design information on the second instrument 42. The objects $33_4$ to $33_8$ are design information on the power supply circuit, the two CPUs, the input circuit, and the output circuit constituting the first instrument 41.

The objects $33_9$ to $33_{12}$ are design information on the PLC and the three sensors all of which constitute the second instrument 42. In the example illustrated in FIG. 7, the object $33_1$ of system X1 is placed in the uppermost layer, and the object $33_2$ of the first instrument 41 and the object $33_3$ of the second instrument 42 are placed in the layer immediately below the object $33_1$ of system X1. The objects $33_4$ to $33_8$ of the components of the first instrument 41 are placed in the layer immediately below the object $33_2$ of the first instrument 41, and the objects $33_9$ to $33_{12}$ of the components of the second instrument 42 are placed in the layer immediately below the object $33_3$ of the second instrument 42.

Note that the object $33_2$ may include the design information on the power supply circuit, the two CPUs, the input circuit, and the output circuit all of which constitute the first instrument 41, in which case the objects $33_4$ to $33_8$ are not provided in the system configuration file 30. Similarly, the object $33_3$ may include the design information on the PLC and the three sensors all of which constitute the second instrument 42, in which case the objects $33_9$ to $33_{12}$ are not provided in the system configuration file 30.

As discussed above, the system configuration file 30 is configured by hierarchizing the plurality of objects 33 that are the design information on the FA system 40. The system configuration file 30 is an extensible markup language (XML) file, but may be a file in a format other than XML.

Let us now return to FIG. 5 to continue the explanation of the control unit 20. After step S14, the display control unit 22 displays, on the display unit 12, an identification information setting screen for setting identification information for one or more objects 33 of the system configuration file 30, on the basis of the system configuration file 30 stored in the storage unit 10 (step S15).

Figure 8:
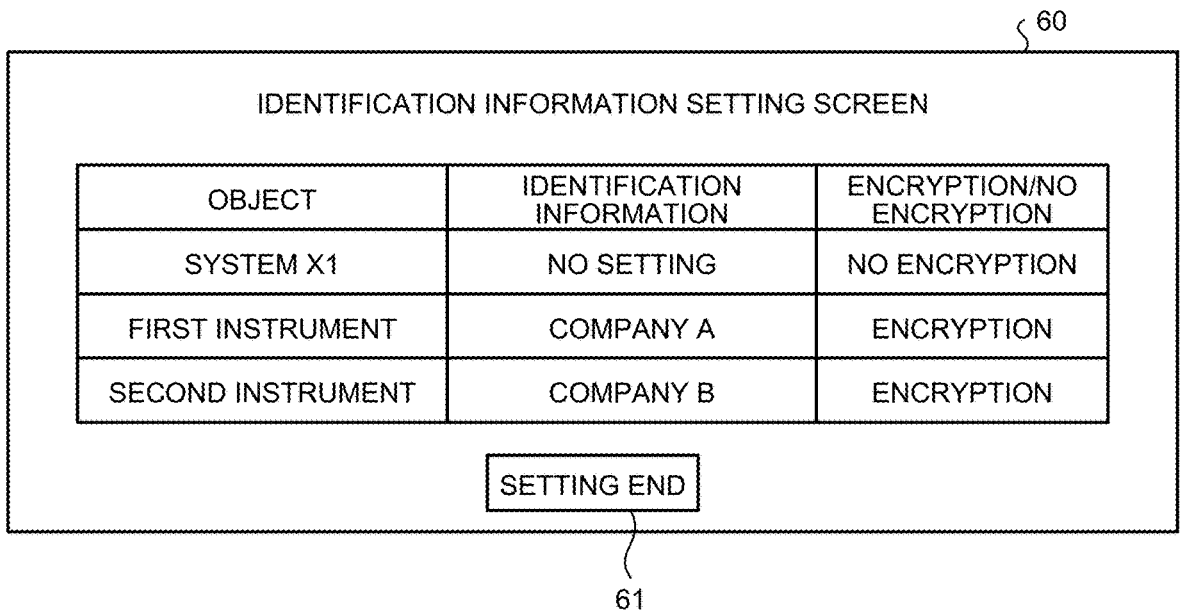
FIG. 8 is a diagram illustrating an example of an identification information setting screen according to the first embodiment.

FIG. 8 is a diagram illustrating an example of an identification information setting screen according to the first embodiment. On the identification information setting screen 60 illustrated in FIG. 8, information identifying the object 33, identification information on a supplier, and information indicating whether encryption is to be performed are associated with one another. In the example illustrated in FIG. 8, each of "system X1", "first instrument", and "second instrument" is included in the identification information setting screen 60 as information identifying the object 33. "System X1" is information indicating the name of the FA system 40. Each of "first instrument" and "second instrument" is information indicating the name of an instrument of the FA system 40.

In the example illustrated in FIG. 8, each of "company A" and "company B" is included in the identification information setting screen 60 as identification information on a supplier. On the identification information setting screen 60, "company A" is associated with "first instrument", and "company B" is associated with "second instrument". Similarly, "no setting" is associated with "system X1". "No setting" is information indicating that identification information on a supplier has not been set. "Company A" and "company B" are information that identifies suppliers, e.g. information indicating the names of supplier companies or information indicating identifiers unique to supplier companies.

Information indicating whether encryption is to be performed is "no encryption" or "encryption". "No encryption" is set for the object 33 that is not to be encrypted, and "encryption" is set for the object 33 that is to be encrypted. In the example illustrated in FIG. 8, "encryption" is associated with "first instrument" and "second instrument", and "no encryption" is associated with "system X1".

When identification information on a supplier is received by the operation receiving unit 21, the setting unit 24 adds the identification information on the supplier received by the operation receiving unit 21, to the identification information setting screen 60. When the identification information setting screen 60 is in the initial state, supplier identification information that is "no setting" is associated with each object 33.

Although only information that identifies each of the objects $33_1$, $33_2$, and $33_3$ is displayed on the identification information setting screen 60 illustrated in FIG. 8, the display control unit 22 can also display information that identifies each of the objects $33_4$ to $33_{12}$ in which case the setting unit 24 can associate identification information on a supplier with each of the objects $33_4$ to $33_{12}$.

Let us now return to FIG. 5 to continue the explanation of the control unit 20. After step S15, the setting unit 24 determines whether an operation of setting identification information for the object 33 has been performed (step S16). When a setting end button 61 on the identification information setting screen 60 illustrated in FIG. 8 is pressed with the identification information setting screen 60 including identification information on a supplier, the setting unit 24 determines that a setting operation has been performed.

When determining that no setting operation has been performed (step S16: No), the setting unit 24 repeats step S16. When determining that a setting operation has been performed (step S16: Yes), the setting unit 24 sets identification information for the object 33 on the basis of the supplier identification information set on the identification information setting screen 60 (step S17). The setting unit 24 associates the supplier identification information set on the identification information setting screen 60 with the object 33, and stores information on the associated supplier identification information and object 33 in the storage unit 10, thereby setting identification information for the object 33.

In a case where the identification information setting screen 60 is in the state illustrated in FIG. 8, the setting unit 24 associates the identification information "company A" with the object $33_2$ of the first instrument 41 and associates the identification information "company B" with the object $33_3$ of the second instrument 42. In a case where the supplier identification information set on the identification information setting screen 60 is information indicating the name of the supplier company, the setting unit 24 can associate information indicating the identifier unique to the supplier company, with the object 33. That is, the identification information associated with the object 33 may not be the identification information itself set on the identification information setting screen 60.

In a case where the object 33 having a supplier set is set to be encrypted, the setting unit 24 stores, in the storage unit 10, the object 33 in association with an encryption setting. For example, in a case where the identification information setting screen 60 is in the state illustrated in FIG. 8, the setting unit 24 stores the object $33_2$ of the first instrument 41 and the object $33_3$ of the second instrument 42 in the storage unit 10, each of the object $33_2$ and the object $33_3$ being associated with information indicating that encryption is to be performed.

Figure 9:
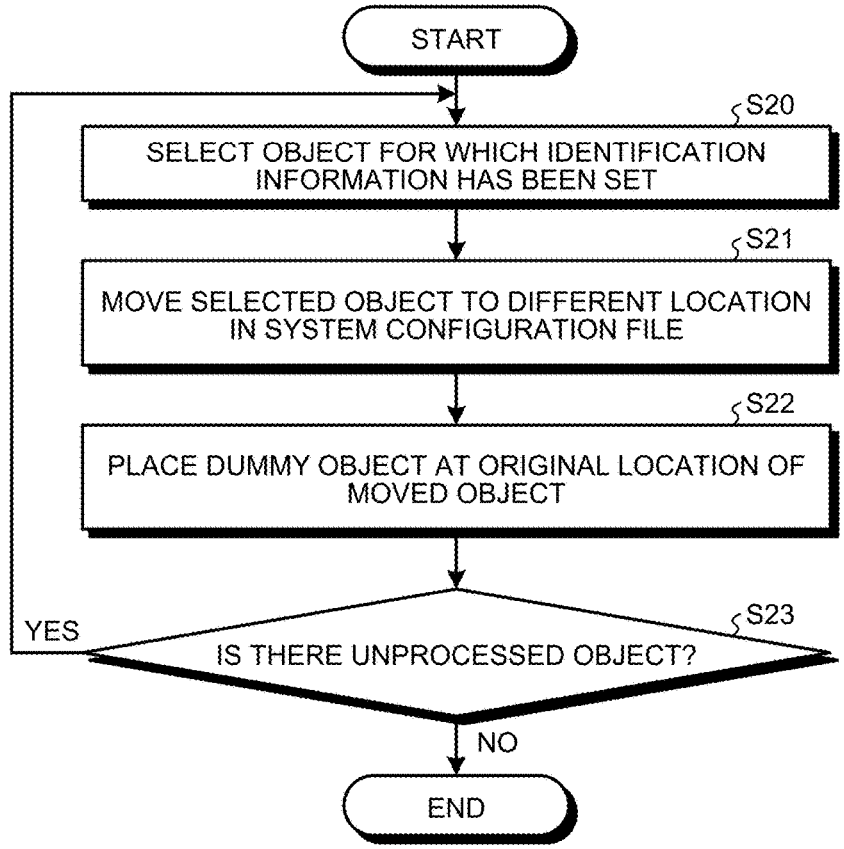
FIG. 9 is a flowchart illustrating an example of change processing on a system configuration file by an arrangement control unit according to the first embodiment.

Let us now return to FIG. 5 to continue the explanation of the control unit 20. After step S17, the arrangement control unit 25 executes change processing for generating the system configuration file 30 including the dummy object 34 (step S18). FIG. 9 is a flowchart illustrating an example of change processing on a system configuration file by the arrangement control unit according to the first embodiment.

As illustrated in FIG. 9, the arrangement control unit 25 selects the object 33 for which identification information has been set (step S20), and moves the selected object 33 to a different location within the system configuration file 30 (step S21). Then, the arrangement control unit 25 places the dummy object 34 at the original location of the moved object 33 (step S22).

Next, the arrangement control unit 25 determines whether there is an unprocessed object 33 (step S23). In step S23, the arrangement control unit 25 determines that there is an unprocessed object 33 when, of the objects 33 for which identification information has been set, an object 33 that has not been selected in step S20 exists.

When determining that there is an unprocessed object 33 (step S23: Yes), the arrangement control unit 25 shifts the processing to step S20. When determining that there is no unprocessed object 33 (step S23: No), the arrangement control unit 25 ends the processing illustrated in FIG. 9.

Figure 10:
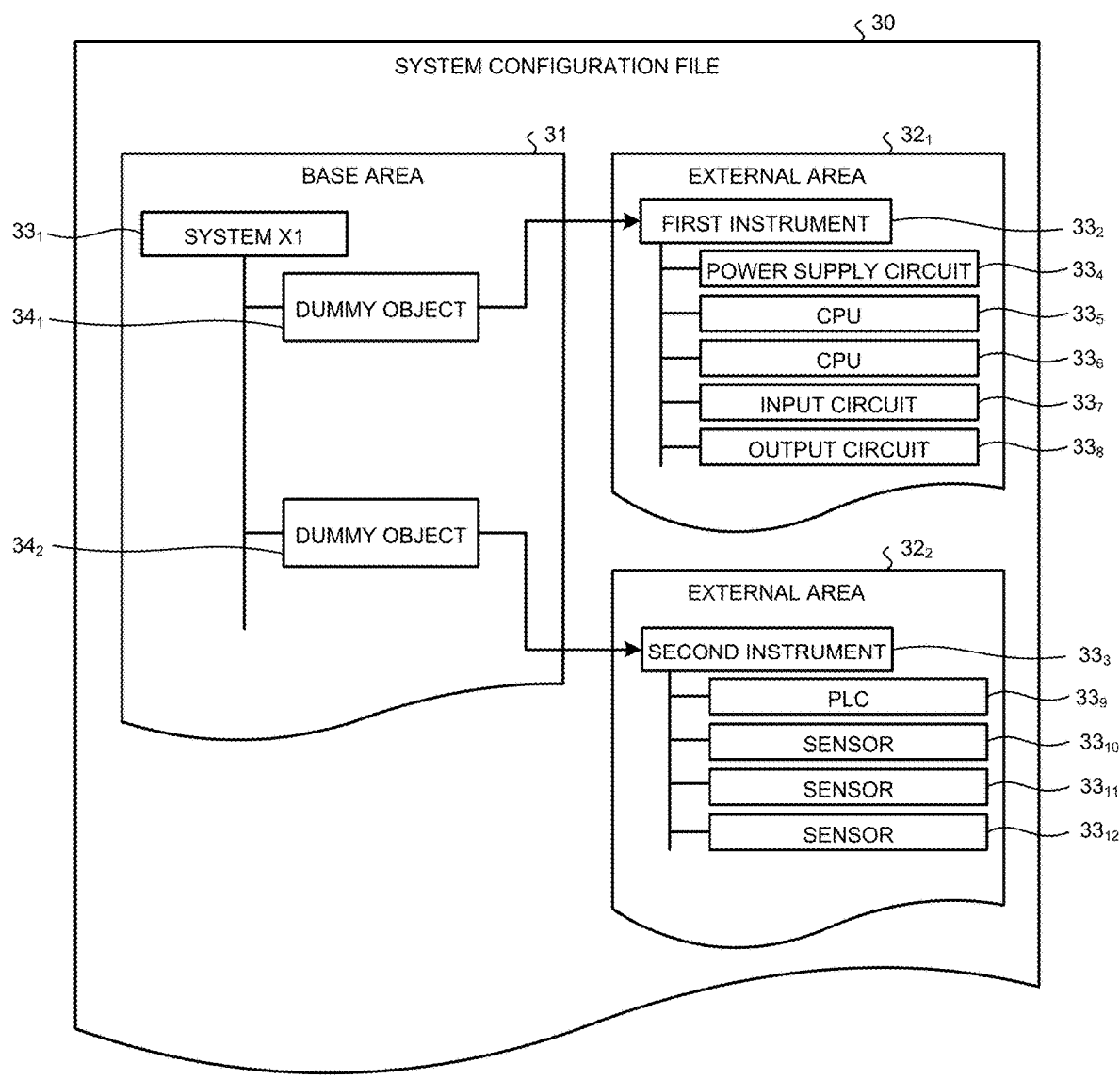
FIG. 10 is a diagram illustrating an example of a system configuration file in which the arrangement of objects is changed by the arrangement control unit according to the first embodiment.
Figure 11:
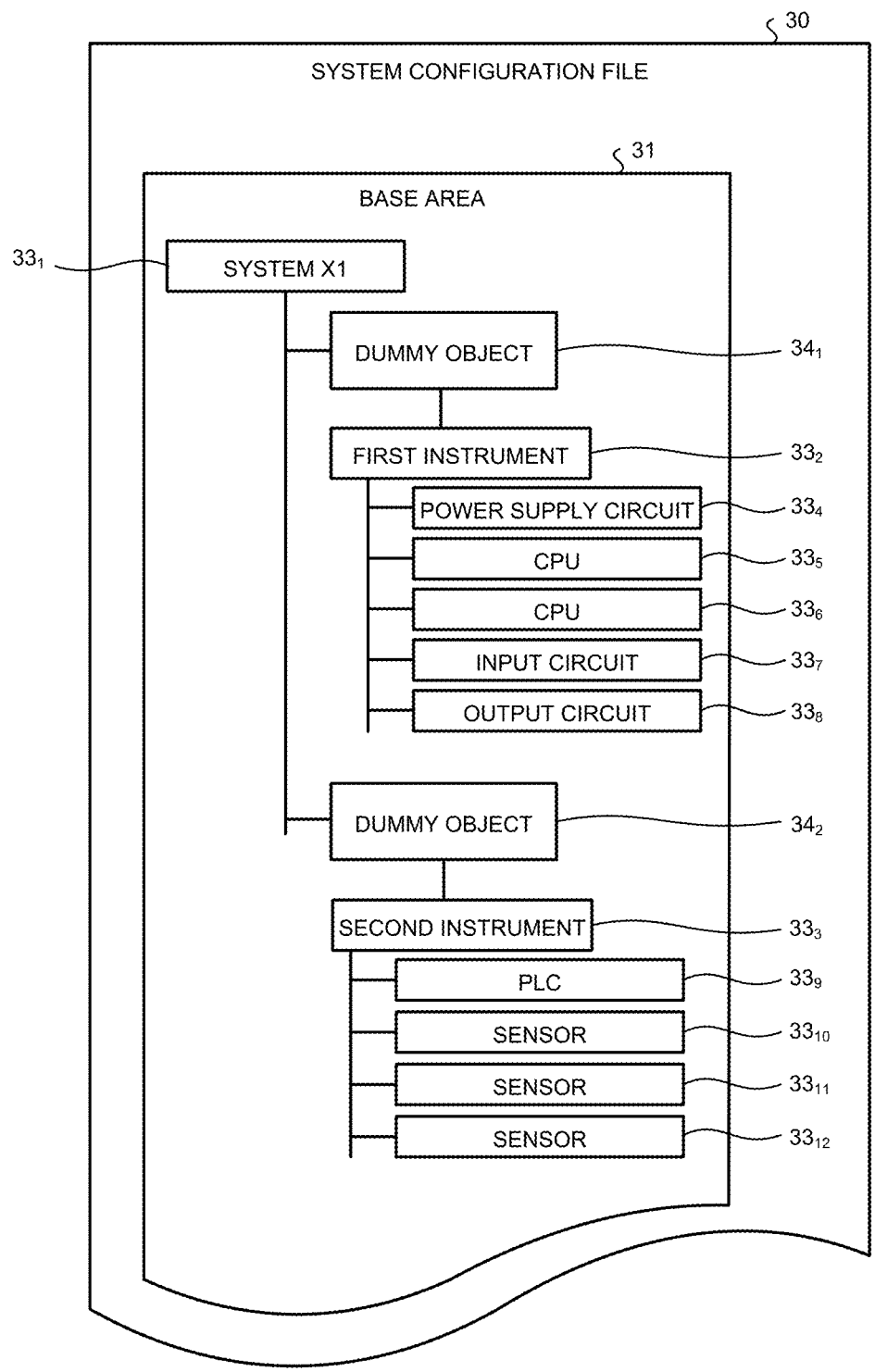
FIG. 11 is a diagram illustrating an example of a system configuration file in which the arrangement of objects is changed by the arrangement control unit according to the first embodiment.

FIGS. 10 and 11 are diagrams illustrating examples of system configuration files in which the arrangement of objects is changed by the arrangement control unit according to the first embodiment. FIG. 10 is an example of the system configuration file 30 in which the object 33 for which identification information has been set is placed outside the base area 31 by the arrangement control unit 25 when the identification information setting screen 60 is in a state illustrated in FIG. 8.

In the example illustrated in FIG. 10, the object $33_2$ is moved to an external area $32_1$ outside the base area 31 in the system configuration file 30, and the object $33_3$ is moved to an external area $32_2$ outside the base area 31 in the system configuration file 30. The objects $33_4$ to $33_8$ are moved to the external area $32_1$ such that the objects $33_4$ to $33_8$ are located in the layer below the object $33_2$. The objects $33_9$ to $33_{12}$ are moved to the external area $32_2$ such that the objects $33_9$ to $33_{12}$ are located in the layer below the object $33_3$. Hereinafter, the external areas $32_1$ and $32_2$ may be collectively referred to as the external area(s) 32.

In addition, the dummy object $34_1$ is placed at the original location of the object $33_2$, and the dummy object $34_2$ is placed at the original location of the object $33_3$. The dummy object $34_1$ includes the identification information "company A" set for the object $33_2$ and information on the destination of the object $33_2$, and the dummy object $34_2$ includes the identification information "company B" set for the moved object $33_3$ and information on the destination of the object $33_3$.

As discussed above, the objects $33_2$ and $33_3$ for which identification information has been set by the setting unit 24 and the objects $33_4$ to $33_{12}$ located in layers below the objects $33_2$ and $33_3$ can be moved to the external areas $32_1$ and $32_2$ outside the base area 31 by the arrangement control unit 25. In the example described above, the arrangement control unit 25 provides the external area 32 for each supplier, but the arrangement control unit 25 can also provide the external area 32 for each object 33 or provide the external area 32 common to a plurality of suppliers.

Note that the objects $33_2$, $33_3$, and $33_4$ to $33_{12}$ for which identification information has been set by the setting unit 24 can also be moved to an external file for each supplier outside the system configuration file 30 by the arrangement control unit 25. In this case, the arrangement control unit 25 newly generates an external file for each supplier.

FIG. 11 is an example of the system configuration file 30 in which the object 33 for which identification information has been set is placed inside the base area 31 by the arrangement control unit 25 when the identification information setting screen 60 is in a state illustrated in FIG. 8.

In the example illustrated in FIG. 11, the object $33_2$ is moved to the layer immediately below the layer of the original location of the object $33_2$ in the base area 31, and the object $33_3$ is moved to the layer immediately below the layer of the original location of the object $33_3$ in the base area 31. The objects $33_4$ to $33_8$ are moved to different locations within the base area 31 such that the objects $33_4$ to $33_8$ are located in the layer below the object $33_2$. The objects $33_9$ to $33_{12}$ are moved to different locations within the base area 31 such that the objects $33_9$ to $33_{12}$ are located in the layer below the object $33_3$.

As discussed above, the objects $33_2$ and $33_3$ for which identification information has been set by the setting unit 24 and the objects $33_4$ to $33_{12}$ located in layers below the objects $33_2$ and $33_3$ can be moved to different locations within the base area 31 by arrangement control unit 25.

In the example described above, the arrangement control unit 25 moves the object 33 for which identification information has been set, to the layer immediately below the layer of the original location, but the destination may be a layer other than the layer immediately below the layer of the original location. That is, the arrangement control unit 25 can also move the object 33 for which identification information has been set, to a hierarchy other than the hierarchy including the layer of the original location that is the highest layer. Also in this case, the arrangement control unit 25 moves the object 33 located in a layer below the object 33 for which identification information has been set.

The arrangement control unit 25 can automatically determine whether to move each object 33 for which identification information has been set, to a different location within the base area 31, to the external area 32 outside the base area 31, or to an external file. The arrangement control unit 25 can also determine the destination of the object 33 on an object-by-object basis.

For example, the arrangement control unit 25 can determine the destination of the object 33 on the basis of whether the object 33 is set to be encrypted. The arrangement control unit 25 determines that the destination of the object 33 set to be encrypted is the external area 32 or an external file, and the destination of the object 33 that is not set to be encrypted is a different location within the base area 31.

On the basis of the destination information set by a user operation received by the operation receiving unit 21, the arrangement control unit 25 can also determine whether to move each object 33 for which identification information has been set, to a different location within the base area 31, to the external area 32 outside the base area 31, or to an external file. The destination information described above includes, for example, information identifying the object 33 and information identifying the destination of the object 33.

As discussed above, in the single system configuration file 30, identification information on a supplier is set for the object 33 so that the supplier and the object 33 are linked to each other. Therefore, information of each supplier can be grasped in the single system configuration file 30.

Figure 12:
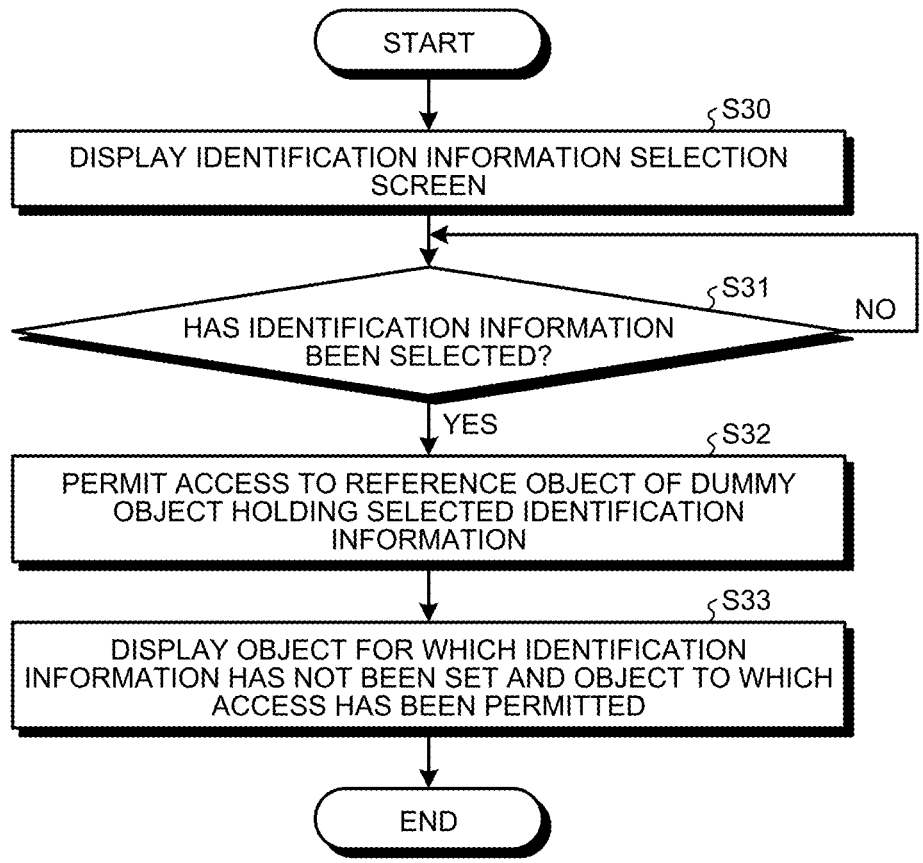
FIG. 12 is a flowchart illustrating an example of display processing on a system configuration file according to the first embodiment.

Next, an example of display processing on the system configuration file 30 by the control unit 20 of the system construction support device 1 will be described. FIG. 12 is a flowchart illustrating an example of display processing on a system configuration file according to the first embodiment.

As illustrated in FIG. 12, the display control unit 22 of the control unit 20 displays an identification information selection screen on the display unit 12 (step S30). The identification information selection screen is a screen for selecting identification information held by the dummy object 34 in the system configuration file 30. The display control unit 22 determines whether one or more pieces of identification information have been selected from among the plurality of pieces of identification information included in the identification information selection screen (step S31). When determining that identification information has not been selected (step S31: No), the display control unit 22 repeats step S31.

Figure 13:
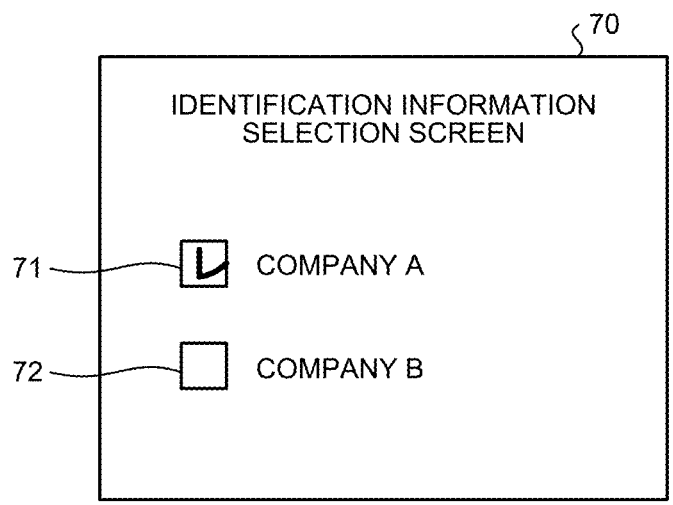
FIG. 13 is a diagram illustrating an example of an identification information selection screen according to the first embodiment.

FIG. 13 is a diagram illustrating an example of an identification information selection screen according to the first embodiment. As illustrated in FIG. 13, the identification information selection screen 70 is a screen including a list of identification information held by the dummy object 34 in the system configuration file 30, and checkboxes 71 and 72 for selecting identification information. In the example illustrated in FIG. 13, "company A" and "company B" are pieces of identification information. The user can select "company A" by checking the checkbox 71, and can select "company B" by checking the checkbox 72. Note that the identification information selection screen 70 is not limited to the example illustrated in FIG. 13 as long as identification information can be selected.

In step S31 illustrated in FIG. 12, when it is determined that identification information has been selected (step S31: Yes), the access control unit 26 permits access to the reference object 33 referred to by the dummy object 34 that holds the selected identification information (step S32). The object 33 referred to by the dummy object 34 is the object 33 identified by the destination information included in the dummy object 34. For example, assume that the identification information selected on the identification information selection screen 70 is "company A" and the system configuration file 30 is in the state illustrated in FIG. 10 or 11. In this case, the destination referred to by the dummy object $34_1$ is the object $33_2$, and the destination referred to by the dummy object $34_2$ is the object $33_3$.

Next, the display control unit 22 displays, on the display unit 12, the object 33 for which identification information has not been set and the object 33 to which access has been permitted (step S33). For example, assume that the identification information selected on the identification information selection screen 70 is "company A" and the system configuration file 30 is in the state illustrated in FIG. 10 or 11. In this case, the display control unit 22 displays, on the display unit 12, the object $33_1$ for which identification information has not been set and the objects $33_2$ and $33_4$ to $33_8$ to which access has been permitted.

As described above, the system construction support device 1 does not display the object 33 for which identification information other than the identification information selected on the identification information selection screen 70 has been set. Therefore, only the necessary objects 33 can be displayed on a supplier-by-supplier basis, and the supplier does not need to be aware of design information of other suppliers.

Note that step S33 is not limited to displaying the object 33 on the display unit 12, and can display the object 33 on the display unit of a supplier terminal device connected via the communication network. The supplier terminal device is the above-described external device, and may be referred to as a supplier terminal hereinafter.

For example, assume that identification information is selected on the identification information selection screen 70 by operating the supplier terminal accessing the system construction support device 1 via the communication network. In this case, the display control unit 22 transmits, from the communication unit 13 to the supplier terminal via the communication network, display information including the object 33 for which identification information has not been set and the object 33 to which access has been permitted. On the basis of the display information acquired from the system construction support device 1, the control unit of the supplier terminal displays, on the display unit of the supplier terminal, the object 33 for which identification information has not been set and the object 33 to which access has been permitted. Consequently, an employee of the supplier can check only the necessary objects 33.

Figure 14:
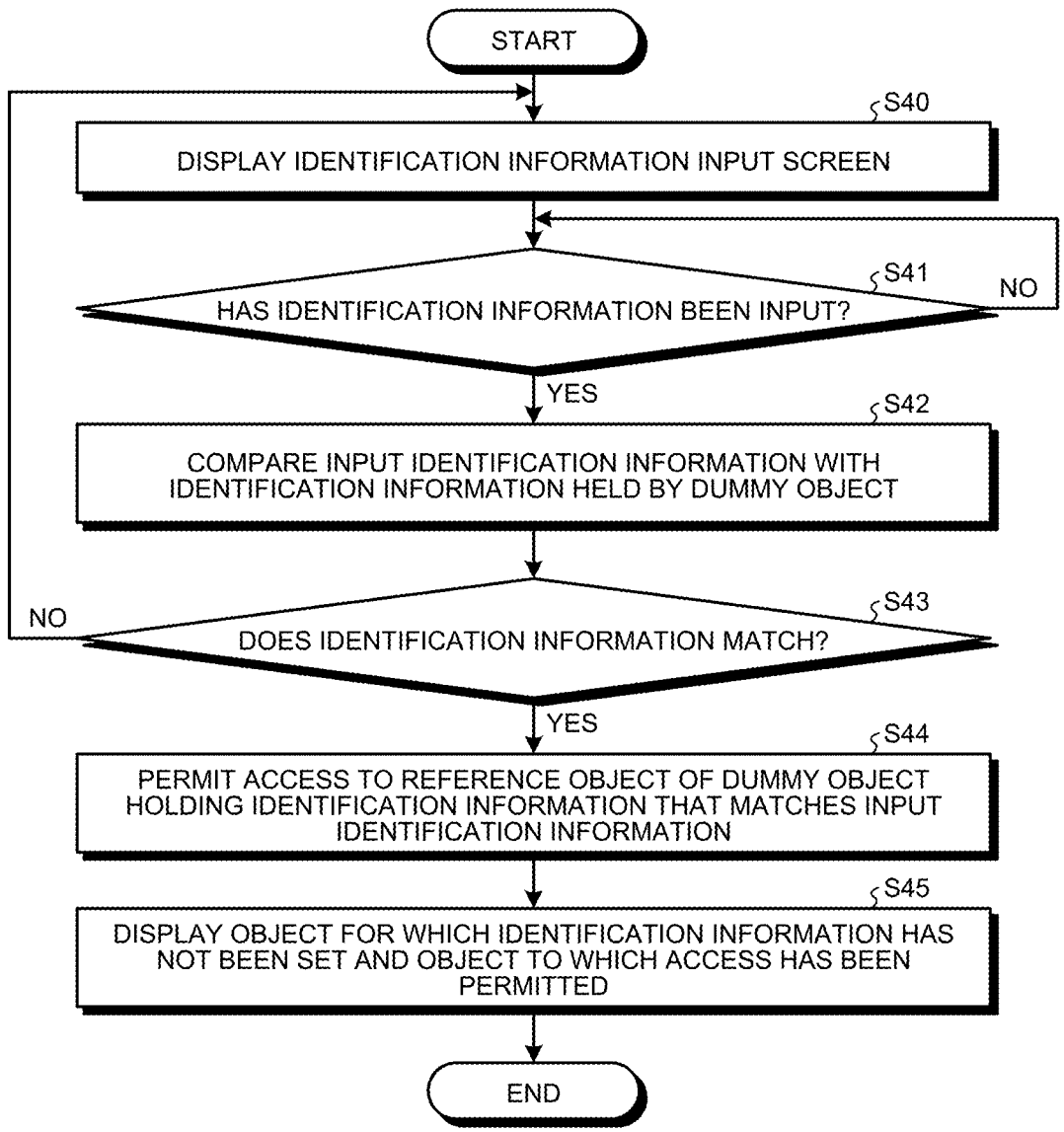
FIG. 14 is a flowchart illustrating another example of display processing on a system configuration file according to the first embodiment.

Next, another example of display processing on the system configuration file 30 by the control unit 20 of the system construction support device 1 will be described. FIG. 14 is a flowchart illustrating another example of display processing on a system configuration file according to the first embodiment, and FIG. 15 is a diagram illustrating an example of an identification information input screen according to the first embodiment.

As illustrated in FIG. 14, the display control unit 22 displays an identification information input screen on the display unit 12 (step S40). The access control unit 26 determines whether identification information has been input on the identification information input screen (step S41). When determining that identification information has not been input (step S41: No), the access control unit 26 repeats step S41.

Figure 15:
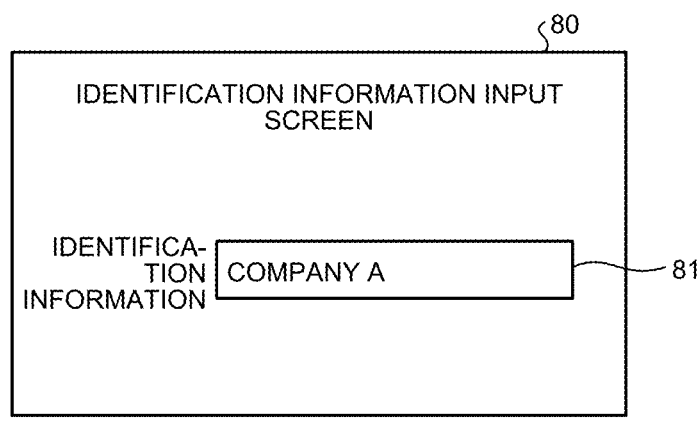
FIG. 15 is a diagram illustrating an example of an identification information input screen according to the first embodiment.

As illustrated in FIG. 15, the identification information input screen 80 is a screen including an entry field 81 for inputting identification information. In the example illustrated in FIG. 15, "company A" is input as identification information in the entry field 81.

When determining that identification information has been input (step S41: Yes), the access control unit 26 compares the input identification information with the identification information held by the dummy object 34 (step S42). The access control unit 26 determines whether the input identification information matches the identification information held by the dummy object 34 (step S43). When determining that the input identification information does not match the identification information held by the dummy object 34 (step S43: No), the access control unit 26 shifts the processing to step S40.

When determining that the input identification information matches the identification information held by the dummy object 34 (step S43: Yes), the access control unit 26 permits access to the object 33 referred to by the dummy object 34 holding the identification information that matches the input identification information (step S44). The display control unit 22 displays the object 33 for which identification information has not been set and the object 33 to which access has been permitted, as in step S33 (step S45).

As described above, the system construction support device 1 does not display the object 33 for which identification information other than the identification information input on the identification information input screen 80 has been set. For example, when the identification information input on the identification information input screen 80 is "company A", the object 33 for which identification information of company B has been set is not displayed. Therefore, for example, it is possible to prevent the design information which the supplier described in the system configuration file 30, from leaking to other competitors.

Further, similarly to step S33, step S45 is not limited to displaying the object 33 on the display unit 12, and can display the object 33 on the display unit of a supplier terminal connected via the communication network. In this case, it is necessary to input identification information at the supplier terminal.

Figure 16:
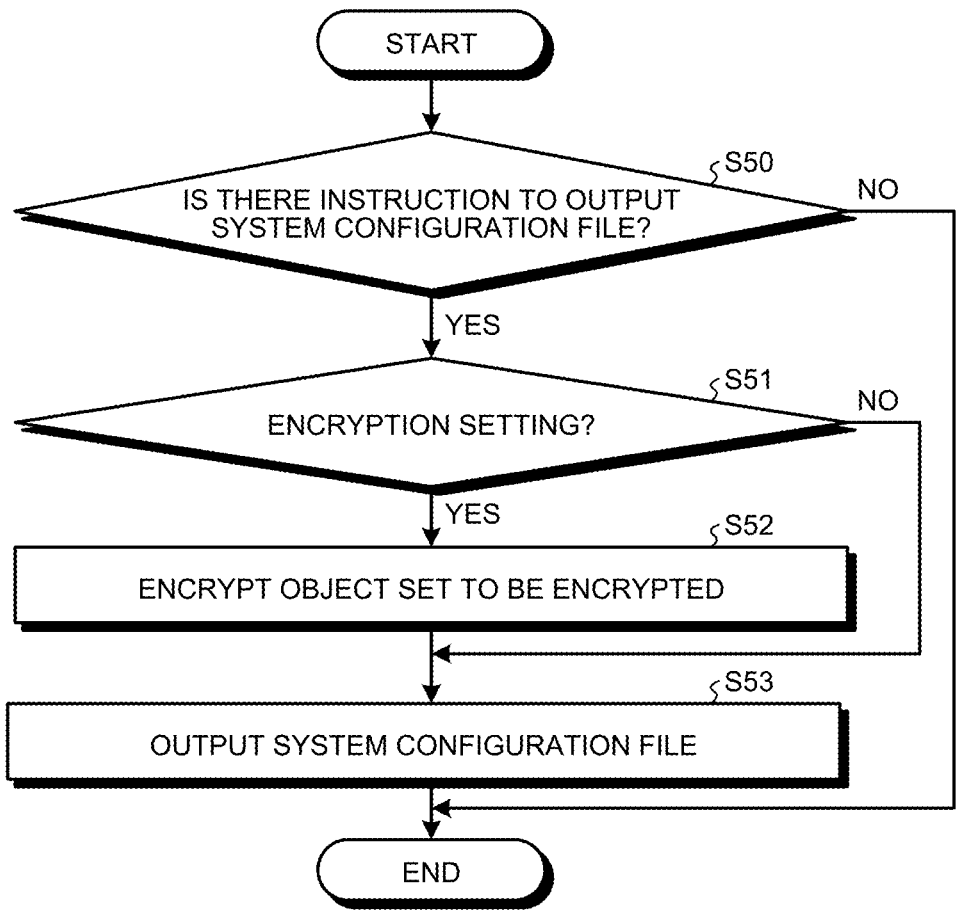
FIG. 16 is a flowchart illustrating an example of transmission processing on a system configuration file according to the first embodiment.
Figure 17:
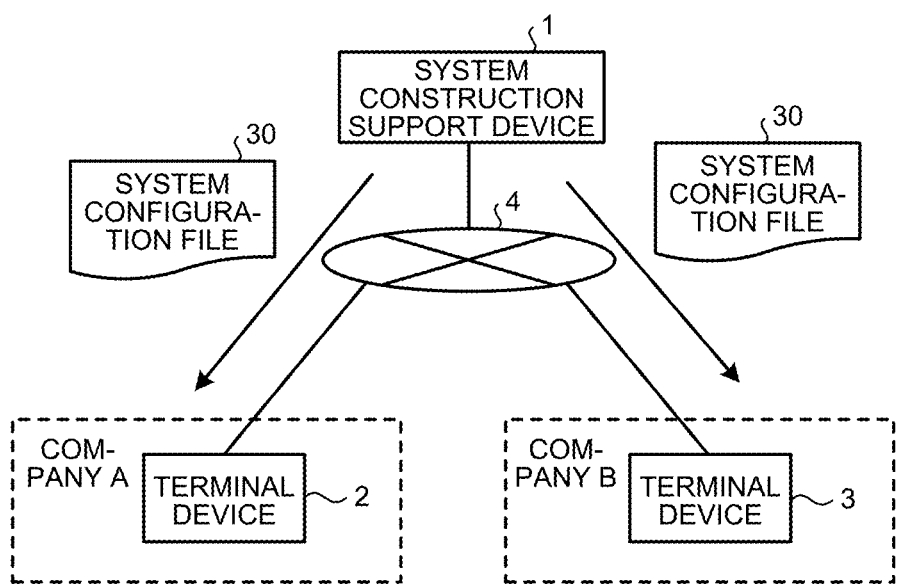
FIG. 17 is a diagram illustrating transmission of a system configuration file according to the first embodiment.

Next, an example of a process of sending the system configuration file 30 from the system construction support device 1 to a supplier company will be described. FIG. 16 is a flowchart illustrating an example of transmission processing on a system configuration file according to the first embodiment, and FIG. 17 is a diagram illustrating transmission of a system configuration file according to the first embodiment. The processing illustrated in FIG. 16 is repeatedly executed by the control unit 20.

As illustrated in FIG. 16, the output unit 28 of the control unit 20 determines whether there is an instruction to output the system configuration file 30 (step S50). When the output unit 28 determines that there is an instruction to output the system configuration file 30 (step S50: Yes), the encryption unit 27 determines whether the object 33 of the supplier that has issued the output instruction is set to be encrypted (step S51).

In step S51, the encryption unit 27 determines that the object 33 associated with an encryption setting by the setting unit 24 is the object 33 set to be encrypted. For example, in a case where encryption/no encryption is set as illustrated in the identification information setting screen 60 of FIG. 8, the encryption unit 27 determines that the object $33_2$ of the first instrument 41 and the object $33_3$ of the second instrument 42 are the objects 33 set to be encrypted.

When determining that there is an encryption setting (step S51: Yes), the object 33 set to be encrypted is encrypted by the encryption unit 27 (step S52). The encryption is performed using different encryption keys for different suppliers. In a case where the destination of the object 33 set to be encrypted is the external area 32 or an external file, the encryption unit 27 can encrypt the entire external area 32 or external file having the object 33. Consequently, if there is a plurality of objects 33 moved to the external area 32 or an external file, the plurality of objects 33 can be collectively encrypted. In a case where the external area 32 or an external file is provided for each supplier, the external area 32 or external file of a supplier is encrypted using the encryption key unique to that supplier.

After step S52 is completed by the encryption unit 27, the output unit 28 outputs, from the communication unit 13 to the terminal device via the communication network, the system configuration file 30 with the encrypted object 33, external area 32, or external file (step S53). When it is determined that there is no encryption setting (step S51: No), the output unit 28 reads the system configuration file 30 from the storage unit 10 and outputs the read system configuration file 30 from the communication unit 13 to the terminal device via the communication network in step S53. After step S53 or when it is determined that there is no instruction to output the system configuration file 30 (step S50: No), the control unit 20 ends the processing illustrated in FIG. 16.

In the above-described example, the encryption unit 27 performs encryption processing in the transmission processing for the system configuration file 30, but may perform encryption processing in the above-described change processing for the system configuration file 30.

In the example illustrated in FIG. 17, the system configuration file 30 is transmitted from the system construction support device 1 to a terminal device 2 of company A and a terminal device 3 of company B via a communication network 4. Note that the system configuration file 30 can be recorded on a recording medium and sent to company A and company B. In a case where an external file is generated (not illustrated), a system configuration file group including the external file and the system configuration file 30 is sent to company A and company B.

Because identification information is set in the system configuration file 30 as described above, the user can send the system configuration file 30 common to all destinations without having to create different system configuration files 30 for different transmission destinations. For example, on the basis of information on the destination included in the dummy object 34 having the identification information that matches the identification information "company A", company A can confirm the object 33 for which company A received an order among the objects 33 included in the system configuration file 30.

Further, at least one of the object 33, the external area 32, and the external file of a supplier can be encrypted using the encryption key unique to the supplier. Therefore, the supplier can keep the design information secret from other suppliers.

In step S51, instead of determining whether the object 33 of the supplier that has issued the output instruction is set to be encrypted, the encryption unit 27 can determine whether the object 33 of a supplier other than the supplier that has issued the output instruction is set to be encrypted. In this case, using the encryption key unique to the supplier other than the supplier that has issued the output instruction, the encryption unit 27 encrypts the object 33 of the other supplier set to be encrypted than the supplier that has issued the output instruction.

For example, in a case where the identification information setting screen 60 is set as illustrated in FIG. 8 and the supplier that has issued the output instruction is company B, the encryption unit 27 determines that the object $33_2$ of the first instrument 41 is the object 33 set to be encrypted, and encrypts the object $33_2$. Consequently, the system configuration file 30 with the encrypted object 33 of the supplier other than the supplier that has issued the output instruction is transmitted to the terminal device of the supplier that has issued the output instruction. This also allows the supplier to keep the design information secret from other suppliers.

Figure 18:
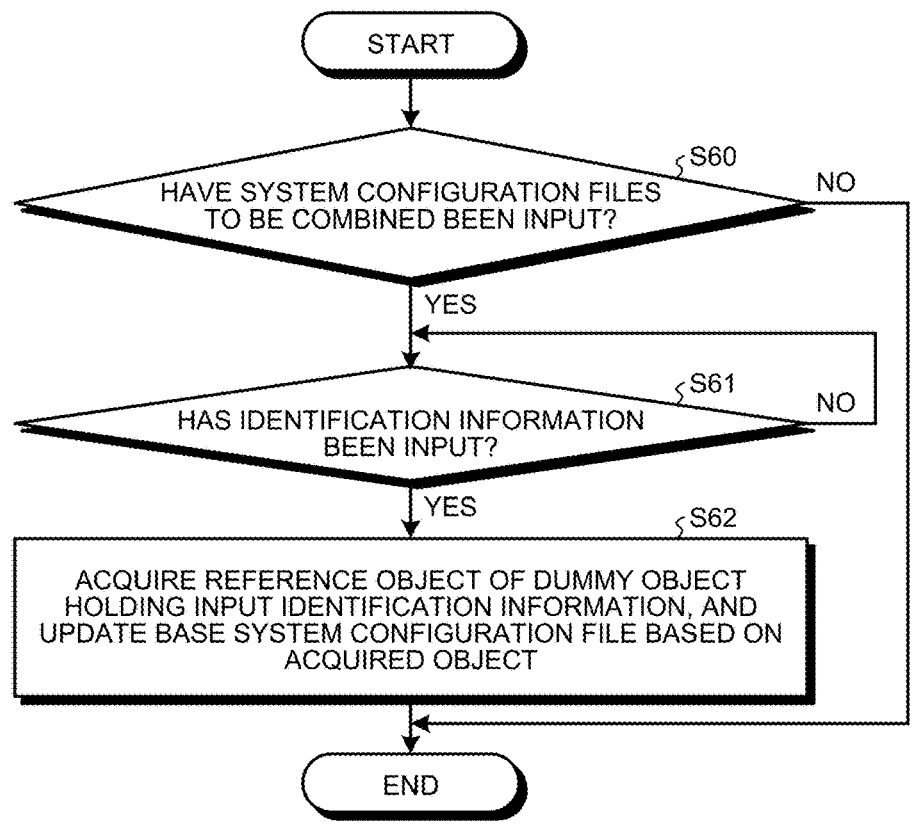
FIG. 18 is a flowchart illustrating an example of combining processing on system configuration files according to the first embodiment.
Figure 19:
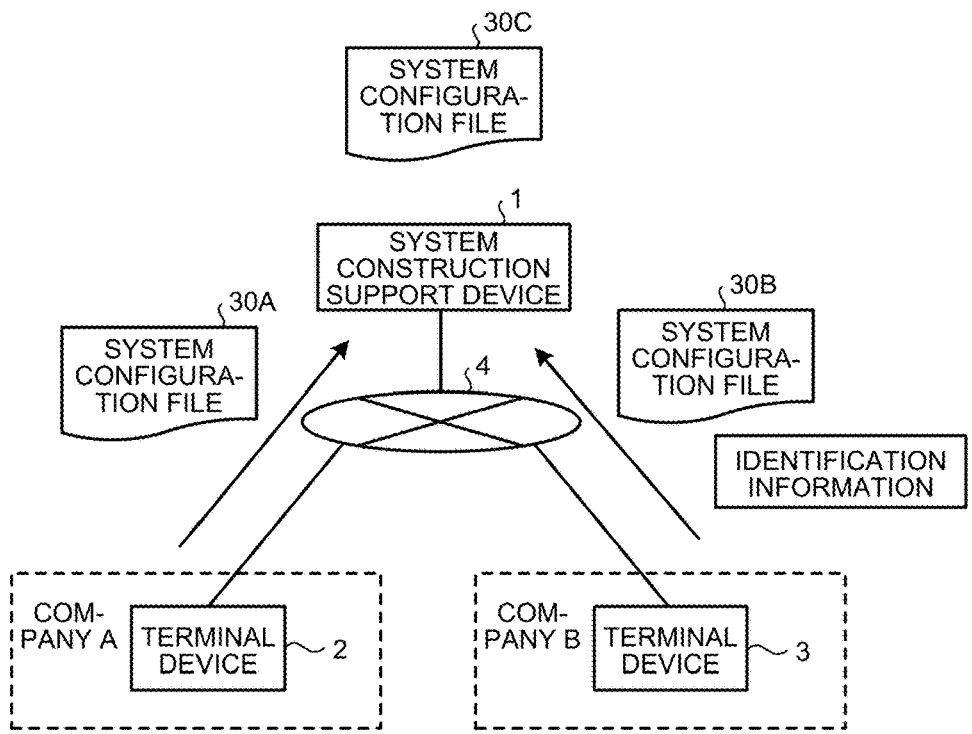
FIG. 19 is a diagram illustrating an example of how the system configuration files edited by suppliers are combined in the system construction support device according to the first embodiment.

Next, an example of a process of combining the system configuration files 30 edited by suppliers in the system construction support device 1 will be described. FIG. 18 is a flowchart illustrating an example of combining processing on system configuration files according to the first embodiment, and FIG. 19 is a diagram illustrating an example of how the system configuration files edited by suppliers are combined in the system construction support device according to the first embodiment. The processing illustrated in FIG. 18 is repeatedly executed.

As illustrated in FIG. 18, the arrangement control unit 25 of the system construction support device 1 determines whether the system configuration files 30 to be combined have been input (step S60). In the example illustrated in FIG. 19, the system configuration file 30A edited by company A is input to the system construction support device 1, and the system configuration file 30B edited by company B is input to the system construction support device 1. Here, the system configuration file 30 edited by company A is referred to as the system configuration file 30A, and the system configuration file 30 edited by company B is referred to as the system configuration file 30B for easy understanding.

When it is determined that the system configuration files 30 to be combined have been input (step S60: Yes), the arrangement control unit 25 determines whether identification information has been input (step S61). In the example illustrated in FIG. 19, identification information of company B is input to the system construction support device 1.

When determining that identification information has not been input (step S61: No), the arrangement control unit 25 repeats step S61 until identification information is input. When determining that identification information has been input (step S61: Yes), the arrangement control unit 25 acquires the object 33 referred to by the dummy object 34 holding the input identification information, and updates the base system configuration file 30 on the basis of the acquired object 33 (step S62). In the example illustrated in FIG. 19, a system configuration file 30C, which is the system configuration file 30 obtained by combining the system configuration file 30A, the system configuration file 30B, and the identification information on company B, is generated.

Figure 20:
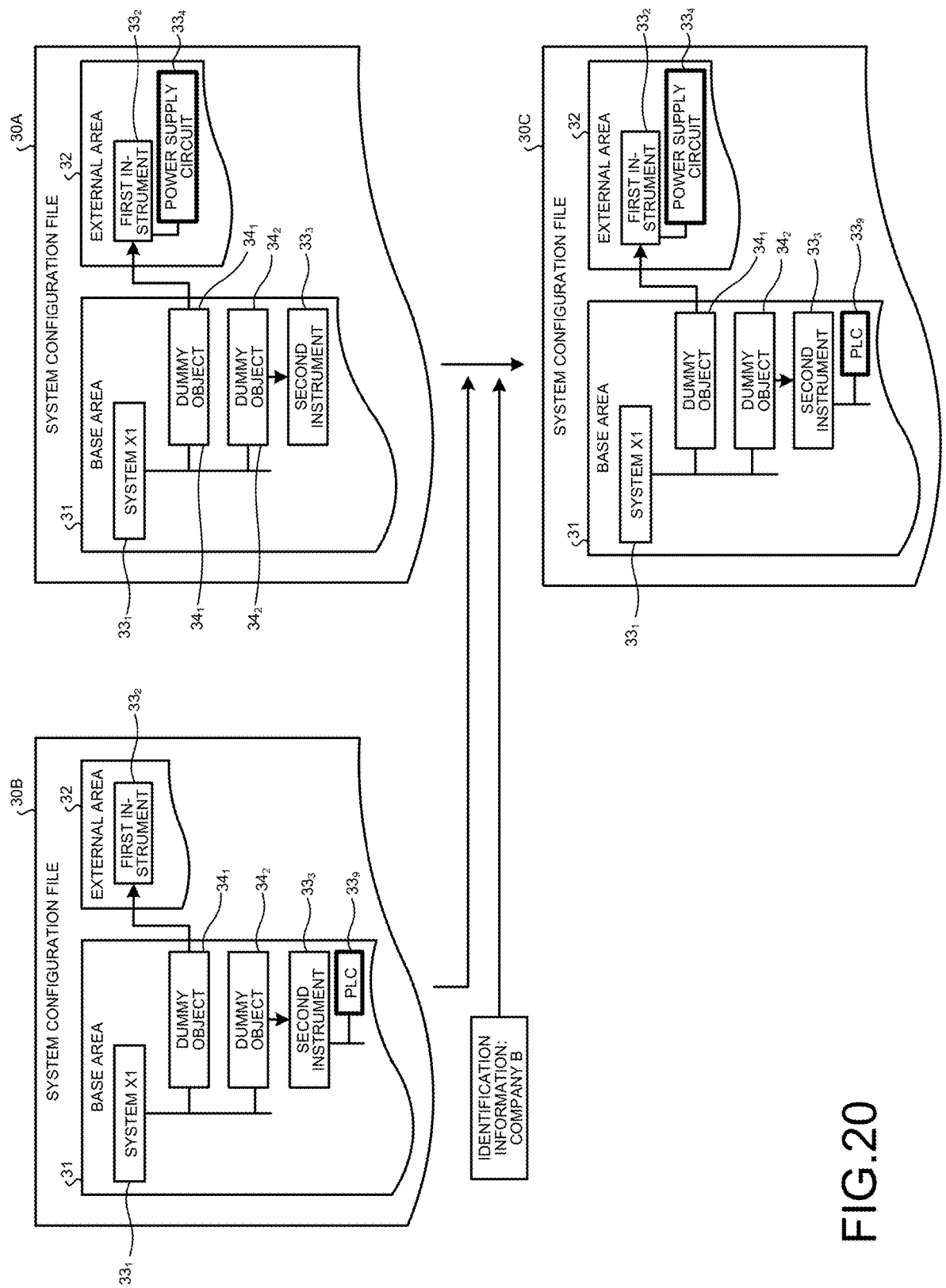
FIG. 20 is a diagram illustrating the relationship between the system configuration files edited by suppliers and the system configuration file obtained by combining the edited system configuration files according to the first embodiment.

FIG. 20 is a diagram illustrating the relationship between the system configuration files edited by suppliers and the system configuration file obtained by combining the edited system configuration files according to the first embodiment. In the example illustrated in FIG. 20, the system configuration file 30 that does not include the objects $33_4$ to $33_{12}$ is sent to companies A and B from the system construction support device 1, and the system configuration file 30 is edited by companies A and B. Company A adds the object $33_4$ to the system configuration file 30 to generate the system configuration file 30A, and company B adds the object $33_9$ to the system configuration file 30 to generate the system configuration file 30B. In a case where an external file is generated, an updated system configuration file group is generated by combining system configuration file groups including the external file and the system configuration file 30.

In FIG. 20, because the arrangement control unit 25 of the system construction support device 1 acquires identification information on company B, the arrangement control unit 25 takes the system configuration file 30A acquired from company A as a base, and combines this base system configuration file 30A with the system configuration file 30B. Specifically, the arrangement control unit 25 detects the object 33 that is referred to by the dummy object 34 holding the identification information "company B". In the example illustrated in FIG. 20, the object 33 that is referred to by the dummy object $34_2$ holding the identification information "company B" is the object $33_3$.

The arrangement control unit 25 replaces the object $33_3$ of the system configuration file 30A with the object $33_3$ of the system configuration file 30B. Specifically, because the object $33_9$ is located in the layer below the object $33_3$ of the system configuration file 30B, the object $33_3$ of the system configuration file 30A is replaced with the object $33_3$ of the system configuration file 30B having the object $33_9$ located in the layer below the object $33_3$. Because the identification information held by the dummy object $34_1$ is "company B", the objects $33_2$ and $33_4$ of the system configuration file 30B are not replaced.

Therefore, the object $33_3$ of the system configuration file 30A is replaced with the objects $33_3$ and $33_9$ of the system configuration file 30B, whereby the system configuration file 30C is generated. As discussed above, the arrangement control unit 25 of the system construction support device 1 can combine the system configuration files 30 edited by suppliers on the basis of identification information.

In a case where identification information is acquired from each of company A and company B, the arrangement control unit 25 can combine the two system configuration files 30, using either the identification information on company A or the identification information on company B. In a case where there are three or more suppliers, the arrangement control unit 25 can combine three or more system configuration files 30, using identification information on two or more suppliers other than the supplier that has edited the base system configuration file 30.

Figure 21:
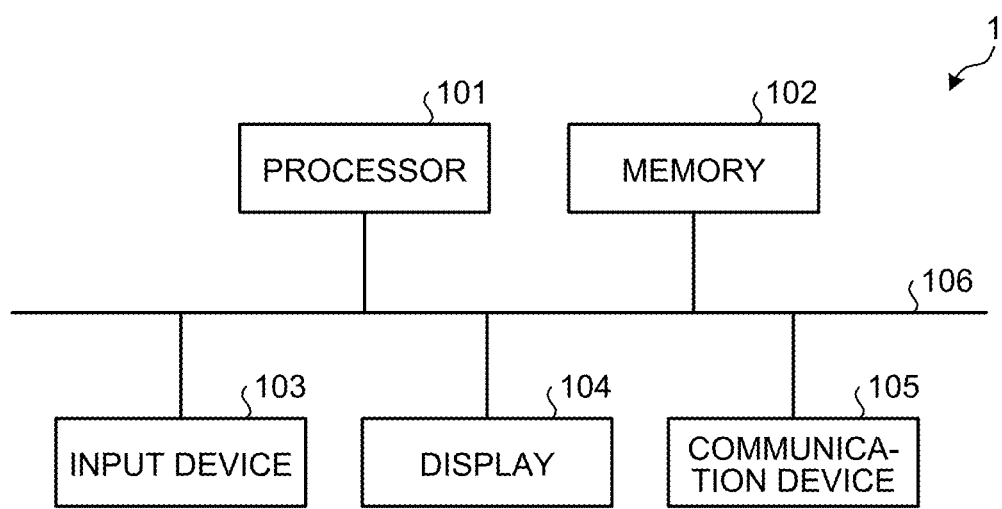
FIG. 21 is a diagram illustrating an exemplary hardware configuration of the system construction support device according to the first embodiment.

Here, a hardware configuration of the system construction support device 1 according to the first embodiment will be described. FIG. 21 is a diagram illustrating an exemplary hardware configuration of the system construction support device according to the first embodiment. As illustrated in FIG. 21, the system construction support device 1 includes a processor 101, a memory 102, an input device 103, a display 104, and a communication device 105. The processor 101, the memory 102, the input device 103, the display 104, and the communication device 105 can exchange data with one another via a bus 106. The storage unit 10 of the system construction support device 1 is implemented by the memory 102. The memory 102 includes a recording medium on which a computer-readable program is recorded. The input unit 11 of the system construction support device 1 is implemented by the input device 103. The display unit 12 of the system construction support device 1 is implemented by the display 104. The communication unit 13 of the system construction support device 1 is implemented by the communication device 105.

The processor 101 reads and executes a program stored in the memory 102 to execute the above-mentioned functions of the operation receiving unit 21, the display control unit 22, the editing unit 23, the setting unit 24, the arrangement control unit 25, the access control unit 26, the encryption unit 27, and the output unit 28. The processor 101 is an example of a processing circuitry, and includes one or more of a CPU, a digital signal processer (DSP), and a system large scale integration (LSI). Examples of the memory 102 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read-only memory (EEPROM, registered trademark), and the like.

As described above, the system construction support device 1 according to the first embodiment includes the storage unit 10, the operation receiving unit 21, the setting unit 24, and the arrangement control unit 25. The storage unit 10 stores the system configuration file 30 having the base area 31 including a plurality of objects 33 hierarchized, the plurality of objects 33 each being design information on an instrument of an FA system. The operation receiving unit 21 receives a user operation. The setting unit 24 sets identification information for at least one of the plurality of objects 33 on the basis of the user operation received by the operation receiving unit 21. The arrangement control unit 25 moves the object 33 for which the identification information has been set by the setting unit 24, to a different location in the system configuration file 30, and places the dummy object 34 at an original location of the object 33 moved to the different location, the dummy object 34 including the identification information set for the object 33 moved and information on a destination of the object 33. Consequently, it is possible to generate the system configuration file 30 in which the relationship between suppliers and objects can be grasped. In addition, because the object 33 is moved to a different location within the system configuration file 30, the relationship between suppliers and objects can be grasped and easily managed by the system configuration file 30 which is a single file including all the objects 33 of the FA system. In this case, because no files other than the single system configuration file 30 are necessary, it is possible to avoid a situation in which the system configuration file and the security sheet become dissociated from each other, which may occur in the conventional art.

The arrangement control unit 25 moves the object 33 for which the identification information has been set, to a different location in the hierarchical structure of the base area 31. Consequently, the object 33 can be moved using the existing base area 31, and the process of separately providing another area is unnecessary.

The arrangement control unit 25 moves the object 33 for which the identification information has been set, to the external area 32 located outside the base area 31 and within the system configuration file 30. Consequently, the object 33 can be moved without complicating the hierarchical structure in the base area 31.

The system construction support device 1 includes the access control unit 26 that permits, when identification information is input or selected through the operation receiving unit 21, access to the object 33 at the destination on the basis of information on the destination included in the dummy object 34 including identification information that matches the identification information input or selected through the operation receiving unit 21. This allows the supplier to keep the design information secret from other suppliers.

The system construction support device 1 includes the encryption unit 27 that encrypts at least one of the external area 32 and the external file. This allows the supplier to keep the design information secret from other suppliers. The external area 32 is an example of an area including the object moved.

The configurations described in the above-mentioned embodiment indicate examples of the contents of the present invention. The configurations can be combined with another well-known technique, and some of the configurations can be omitted or changed in a range not departing from the gist of the present invention.

REFERENCE SIGNS LIST 1 system construction support device; 2, 3 terminal device; 4 communication network; 10 storage unit; 11 input unit; 12 display unit; 13 communication unit; 20 control unit; 21 operation receiving unit; 22 display control unit; 23 editing unit; 24 setting unit; 25 arrangement control unit; 26 access control unit; 27 encryption unit; 28 output unit; 30, 30A, 30B, 30C system configuration file; 31 base area; 32, $32_1$, $32_2$ external area; 33, $33_1$ to $33_{12}$ object; 34, $34_1$, $34_2$ dummy object; 40 FA system; 41 first instrument; 42 second instrument; 50 system configuration editing screen; 51 edit area; 52 edit end button; 53 first area; 54 second area; 60 identification information setting screen; 61 setting end button; 70 identification information selection screen; 71, 72 checkbox; 80 identification information input screen; 81 entry field.

The invention claimed is:
1. A system construction support device comprising:
a processor to execute a program; and
a memory to store a system configuration file having a base area including a plurality of objects hierarchized, the plurality of objects each being design information on an instrument of a factory automation system, the memory storing the program which, when executed by the processor, performs:

an operation receiving process of receiving a user operation;

a setting process of setting identification information for at least one of the plurality of objects on a basis of the user operation received by the operation receiving process; and an arrangement control process of moving the object for which the identification information has been set by the setting process, to a different location within the system configuration file or to an external file, and placing a dummy object at an original location of the object moved to the different location, the dummy object including the identification information set for the object moved and information on a destination of the object moved, the dummy object not including the design information.

2. The system construction support device according to claim 1, wherein the arrangement control process comprises a process of moving the object for which the identification information has been set, to a different layer in a hierarchical structure of the base area or to a different hierarchy.

3. The system construction support device according to claim 2, comprising an access control process of permitting, when identification information is input or selected through the operation receiving process, access to the object at the destination on the basis of information on the destination included in a dummy object including identification information that matches the identification information input or selected through the operation receiving process.

4. The system construction support device according to claim 3, comprising an encryption process of encrypting at least one of an area including the object moved and the external file.

5. The system construction support device according to claim 2, comprising an encryption process of encrypting at least one of an area including the object moved and the external file.

6. The system construction support device according to claim 1, wherein the arrangement control process comprises a process of moving the object for which the identification information has been set, to an external area located outside the base area and within the system configuration file.

7. The system construction support device according to claim 6, comprising an access control process of permitting, when identification information is input or selected through the operation receiving process, access to the object at the destination on the basis of information on the destination included in a dummy object including identification information that matches the identification information input or selected through the operation receiving process.

8. The system construction support device according to claim 7, comprising an encryption process of encrypting at least one of an area including the object moved and the external file.

9. The system construction support device according to claim 6, comprising an encryption process of encrypting at least one of an area including the object moved and the external file.

10. The system construction support device according to claim 1, comprising an access control process of permitting, when identification information is input or selected through the operation receiving process, access to the object at the destination on the basis of information on the destination included in a dummy object including identification information that matches the identification information input or selected through the operation receiving process.

11. The system construction support device according to claim 10, comprising an encryption process of encrypting at least one of an area including the object moved and the external file.

12. The system construction support device according to claim 1, comprising an encryption process of encrypting at least one of an area including the object moved and the external file.

13. A system construction support method that is executed by a computer, the method comprising:

receiving a user operation;

setting, on a basis of the received user operation, identification information for at least one of a plurality of objects in a system configuration file having a base area including the plurality of objects hierarchized, the plurality of objects each being design information on an instrument of a factory automation system; and moving the object for which the identification information has been set in the setting step, to a different location within the system configuration file or to an external file, and placing a dummy object at an original location of the object moved to the different location, the dummy object including the identification information set for the object moved and information on a destination of the object moved, the dummy object not including the design information.

14. A non-transitory storage medium storing a system construction support program that causes a computer to execute:

an operation receiving process of receiving a user operation;

a setting process of setting, on a basis of the user operation received in the operation receiving process, identification information for at least one of a plurality of objects in a system configuration file having a base area including the plurality of objects hierarchized, the plurality of objects each being design information on an instrument of a factory automation system; and an arrangement control process of moving the object for which the identification information has been set in the setting process, to a different location within the system configuration file or to an external file, and placing a dummy object at an original location of the object moved to the different location, the dummy object including the identification information set for the object moved and information on a destination of the object moved, the dummy object not including the design information.

* * * * *